(12) United States Patent
Karaoguz et al.

(10) Patent No.: US 9,110,517 B2
(45) Date of Patent: Aug. 18, 2015

(54) SYSTEM AND METHOD FOR GENERATING SCREEN POINTING INFORMATION IN A TELEVISION

(75) Inventors: Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 556 days.

(21) Appl. No.: 12/774,154

(22) Filed: May 5, 2010

(65) Prior Publication Data

US 2011/0063521 A1 Mar. 17, 2011

Related U.S. Application Data

(60) Provisional application No. 61/242,234, filed on Sep. 14, 2009.

(51) Int. Cl.
| | |
|---|---|
| *G06F 3/033* | (2013.01) |
| *G06F 3/0346* | (2013.01) |
| *G06F 3/03* | (2006.01) |
| *G06F 3/042* | (2006.01) |
| *H04N 21/2343* | (2011.01) |
| *H04N 21/2389* | (2011.01) |
| *H04N 21/422* | (2011.01) |

(Continued)

(52) U.S. Cl.
CPC ............ *G06F 3/0346* (2013.01); *G06F 3/0304* (2013.01); *G06F 3/0325* (2013.01); *G06F 3/0386* (2013.01); *G06F 3/0428* (2013.01); *H04N 5/445* (2013.01); *H04N 21/23892* (2013.01); *H04N 21/234318* (2013.01); *H04N 21/2408* (2013.01); *H04N 21/25841* (2013.01); *H04N 21/2668* (2013.01); *H04N 21/42204* (2013.01); *H04N 21/436* (2013.01); *H04N 21/438* (2013.01); *H04N 21/4325* (2013.01); *H04N 21/4334* (2013.01); *H04N 21/4524* (2013.01); *H04N 21/472* (2013.01); *H04N 21/4725* (2013.01); *H04N 21/4728* (2013.01); *H04N 21/4826* (2013.01); *H04N 21/812* (2013.01); *H04N 21/845* (2013.01); *H04N 21/858* (2013.01); *H04N 21/8545* (2013.01); *H04N 5/76* (2013.01); *H04N 9/8205* (2013.01); *H04N 2005/4428* (2013.01); *H04N 2005/4432* (2013.01)

(58) Field of Classification Search
CPC .......................... G06F 3/0488; G06F 3/04483
See application file for complete search history.

(56) References Cited

U.S. PATENT DOCUMENTS

| | | |
|---|---|---|
| 5,111,511 A | 5/1992 | Ishii et al. |
| 5,408,258 A | 4/1995 | Kolessar |

(Continued)

FOREIGN PATENT DOCUMENTS

WO WO 2007/137611 12/2007

OTHER PUBLICATIONS

Office Action from related U.S. Appl. No. 12/881,004 dated Nov. 1, 2012.

(Continued)

*Primary Examiner* — Jefferey Harold
*Assistant Examiner* — Omer Khalid
(74) *Attorney, Agent, or Firm* — Brinks Gilson & Lione

(57) ABSTRACT

A system and method, in a television, for generating screen pointing information, substantially as shown in and/or described in connection with at least one of the figures, as set forth more completely in the claims.

27 Claims, 9 Drawing Sheets

(51) Int. Cl.

| | | |
|---|---|---|
| H04N 21/432 | (2011.01) | |
| H04N 21/433 | (2011.01) | |
| H04N 21/4725 | (2011.01) | |
| H04N 21/4728 | (2011.01) | |
| H04N 21/845 | (2011.01) | |
| G06F 3/038 | (2013.01) | |
| H04N 5/445 | (2011.01) | |
| H04N 21/482 | (2011.01) | |
| H04N 21/436 | (2011.01) | |
| H04N 21/258 | (2011.01) | |
| H04N 21/45 | (2011.01) | |
| H04N 21/2668 | (2011.01) | |
| H04N 21/472 | (2011.01) | |
| H04N 21/8545 | (2011.01) | |
| H04N 21/858 | (2011.01) | |
| H04N 21/24 | (2011.01) | |
| H04N 21/438 | (2011.01) | |
| H04N 21/81 | (2011.01) | |
| H04N 5/76 | (2006.01) | |
| H04N 9/82 | (2006.01) | |
| H04N 5/44 | (2011.01) | |

(56) References Cited

U.S. PATENT DOCUMENTS

| | | | |
|---|---|---|---|
| 5,543,851 A | 8/1996 | Chang | |
| 5,602,568 A * | 2/1997 | Kim | 345/158 |
| 5,708,845 A * | 1/1998 | Wistendahl et al. | 715/202 |
| 5,718,845 A | 2/1998 | Drost | |
| 5,721,584 A | 2/1998 | Yoshinobu et al. | |
| 5,727,141 A | 3/1998 | Hoddie | |
| 5,793,361 A * | 8/1998 | Kahn et al. | 345/179 |
| 5,929,849 A | 7/1999 | Kikinis | |
| 6,097,441 A | 8/2000 | Allport | |
| 6,122,660 A | 9/2000 | Baransky et al. | |
| 6,255,961 B1 | 7/2001 | Van Ryzin et al. | |
| 6,314,569 B1 | 11/2001 | Chernock et al. | |
| 6,349,410 B1 | 2/2002 | Lortz | |
| 6,407,779 B1 | 6/2002 | Herz | |
| 6,931,660 B1 | 8/2005 | Kalluri et al. | |
| 7,053,965 B1 | 5/2006 | Fan | |
| 7,057,670 B2 | 6/2006 | Kikinis | |
| 7,102,616 B1 | 9/2006 | Sleator | |
| 7,301,530 B2 | 11/2007 | Lee et al. | |
| 7,344,084 B2 | 3/2008 | DeCosta | |
| 7,535,456 B2 | 5/2009 | Liberty | |
| 7,536,706 B1 | 5/2009 | Sezan | |
| 7,612,748 B2 | 11/2009 | Tateuchi | |
| 7,631,338 B2 | 12/2009 | Del Sesto et al. | |
| 7,805,747 B2 | 9/2010 | Klappert | |
| 7,890,380 B2 | 2/2011 | Stefanik | |
| 7,987,478 B2 | 7/2011 | Minor | |
| 8,095,423 B2 | 1/2012 | Nichols | |
| 8,181,212 B2 | 5/2012 | Sigal | |
| 8,223,136 B2 | 7/2012 | Hu et al. | |
| 8,269,746 B2 * | 9/2012 | Hodges et al. | 345/175 |
| 8,359,628 B2 | 1/2013 | Kitaru et al. | |
| 8,421,746 B2 | 4/2013 | Igoe | |
| 2001/0019368 A1 | 9/2001 | Holme et al. | |
| 2001/0023436 A1 | 9/2001 | Srinivasan | |
| 2001/0047298 A1 | 11/2001 | Moore | |
| 2002/0040482 A1 | 4/2002 | Sextro | |
| 2002/0042925 A1 | 4/2002 | Ebisu | |
| 2002/0056136 A1 | 5/2002 | Wistendahl | |
| 2002/0069405 A1 | 6/2002 | Chapin et al. | |
| 2002/0078446 A1 | 6/2002 | Dakss | |
| 2002/0090114 A1 | 7/2002 | Rhoads | |
| 2002/0136432 A1 | 9/2002 | Koike et al. | |
| 2003/0005445 A1 | 1/2003 | Schein | |
| 2003/0023981 A1 | 1/2003 | Lemmons | |
| 2003/0035075 A1 | 2/2003 | Butler et al. | |
| 2003/0054878 A1 * | 3/2003 | Benoy et al. | 463/29 |
| 2003/0115602 A1 | 6/2003 | Knee | |
| 2003/0145326 A1 | 7/2003 | Gutta et al. | |
| 2003/0212996 A1 | 11/2003 | Wolzien | |
| 2003/0236752 A1 | 12/2003 | Dawson et al. | |
| 2004/0078814 A1 | 4/2004 | Allen | |
| 2004/0119701 A1 * | 6/2004 | Mulligan et al. | 345/173 |
| 2004/0236865 A1 | 11/2004 | Ullman | |
| 2005/0028208 A1 | 2/2005 | Ellis | |
| 2005/0153687 A1 | 7/2005 | Niemenmaa et al. | |
| 2005/0193425 A1 | 9/2005 | Sull et al. | |
| 2005/0229227 A1 | 10/2005 | Rogers | |
| 2005/0251835 A1 | 11/2005 | Scott | |
| 2005/0262542 A1 | 11/2005 | DeWeese et al. | |
| 2006/0037044 A1 | 2/2006 | Daniels | |
| 2006/0099964 A1 | 5/2006 | Barrese et al. | |
| 2006/0152489 A1 * | 7/2006 | Sweetser et al. | 345/158 |
| 2006/0174273 A1 | 8/2006 | Park | |
| 2006/0241864 A1 | 10/2006 | Rosenberg | |
| 2007/0097275 A1 | 5/2007 | Dresti et al. | |
| 2007/0130581 A1 | 6/2007 | Del Sesto et al. | |
| 2007/0157260 A1 | 7/2007 | Walker | |
| 2007/0195205 A1 * | 8/2007 | Lowe | 348/734 |
| 2007/0266406 A1 | 11/2007 | Aravamudan | |
| 2007/0277201 A1 | 11/2007 | Wong | |
| 2007/0300263 A1 | 12/2007 | Barton | |
| 2008/0052750 A1 | 2/2008 | Grunnet-Jepsen | |
| 2008/0066097 A1 | 3/2008 | Park et al. | |
| 2008/0066129 A1 | 3/2008 | Katcher et al. | |
| 2008/0109851 A1 | 5/2008 | Heather | |
| 2008/0136754 A1 * | 6/2008 | Tsuzaki et al. | 345/84 |
| 2008/0172693 A1 | 7/2008 | Ludvig | |
| 2008/0204603 A1 | 8/2008 | Hattori | |
| 2008/0204605 A1 | 8/2008 | Tsai | |
| 2008/0209480 A1 | 8/2008 | Eide | |
| 2009/0021473 A1 | 1/2009 | Grant et al. | |
| 2009/0037947 A1 | 2/2009 | Patil | |
| 2009/0083815 A1 | 3/2009 | McMaster et al. | |
| 2009/0165041 A1 | 6/2009 | Penberthy et al. | |
| 2009/0165048 A1 | 6/2009 | Nishimura | |
| 2009/0187862 A1 | 7/2009 | DaCosta | |
| 2009/0217317 A1 | 8/2009 | White | |
| 2009/0235312 A1 | 9/2009 | Morad | |
| 2009/0237572 A1 | 9/2009 | Kishimoto | |
| 2009/0256811 A1 * | 10/2009 | Pasquariello | 345/173 |
| 2010/0064320 A1 | 3/2010 | Angiolillo et al. | |
| 2010/0097348 A1 * | 4/2010 | Park et al. | 345/175 |
| 2010/0098074 A1 | 4/2010 | Kokemak | |
| 2010/0157152 A1 * | 6/2010 | Weitbruch et al. | 348/467 |
| 2010/0162303 A1 | 6/2010 | Cassanova | |
| 2011/0063523 A1 | 3/2011 | Karaoguz et al. | |
| 2011/0066929 A1 | 3/2011 | Karaoguz et al. | |
| 2011/0067062 A1 | 3/2011 | Karaoguz et al. | |
| 2011/0067063 A1 | 3/2011 | Karaoguz et al. | |
| 2011/0067064 A1 | 3/2011 | Karaoguz et al. | |
| 2011/0067069 A1 | 3/2011 | Karaoguz et al. | |
| 2011/0141013 A1 * | 6/2011 | Matthews | 345/158 |
| 2011/0179435 A1 | 7/2011 | Cordray | |
| 2012/0079525 A1 | 3/2012 | Ellis | |

OTHER PUBLICATIONS

Final Office Action from related U.S. Appl. No. 12/881,067 dated Oct. 9, 2012.

Office Action from related U.S. Appl. No. 12/851,075 dated Sep. 5, 2012.

Office Action from related U.S. Appl. No. 12/774,221 dated Aug. 29, 2012.

Final Office Action from related U.S. Appl. No. 12/881,110 dated Oct. 17, 2012.

Office Action from related U.S. Appl. No. 12/850,866 dated Oct. 4, 2012.

Final Office Action from related U.S. Appl. No. 12/850,911 dated Oct. 5, 2012.

Final Office Action from related U.S. Appl. No. 12/880,851 dated Nov. 14, 2012.

Office Action from related U.S. Appl. No. 12/774,321 dated Nov. 14, 2012.

Office Action from related U.S. Appl. No. 12/880,530 dated Aug. 2, 2012.

(56) References Cited

OTHER PUBLICATIONS

Office Action from related U.S. Appl. No. 12/880,594 dated Jun. 19, 2012.
Office Action from related U.S. Appl. No. 12/880,668 dated Jul. 2, 2012.
Office Action from related U.S. Appl. No. 12/881,067 dated Jun. 27, 2012.
Office Action from related U.S. Appl. No. 12/881,096 dated Jun. 19, 2012.
Office Action from related U.S. Appl. No. 12/880,749 dated Aug. 30, 2012.
Office Action from related U.S. Appl. No. 12/851,036 dated Aug. 22, 2012.
Office Action from related U.S. Appl. No. 12/880,851 dated Jun. 20, 2012.
Office Action from related U.S. Appl. No. 12/880,888 dated Jul. 2, 2012.
Office Action from related U.S. Appl. No. 12/881,110 dated May 29, 2012.
Office Action from related U.S. Appl. No. 12/774,380 dated Jul. 9, 2012.
Office Action from related U.S. Appl. No. 12/850,832 dated Aug. 15, 2012.
Office Action from related U.S. Appl. No. 12/850,866 dated Jun. 20, 2012.
Office Action from related U.S. Appl. No. 12/850,911 dated Jun. 20, 2012.
Office Action from related U.S. Appl. No. 12/850,945 dated Aug. 2, 2012.
Office Action from related U.S. Appl. No. 12/880,965 dated Jun. 25, 2012.
Final Office Action from related U.S. Appl No. 12/880,530 dated Jan. 14, 2013.
Final Office Action from related U.S. Appl. No. 12/880,594 dated Nov. 28, 2012.
Office Action from related U.S. Appl. No. 12/880,668 dated Jan. 2, 2013.
Final Office Action from related U.S. Appl. No. 12/881,096 dated Jan. 23, 2013.
Final Office Action from related U.S. Appl. No. 12/880,749 dated Feb. 1, 2013.
Final Office Action from related U.S. Appl. No. 12/880,888 dated Dec. 6, 2012.
Office Action from related U.S. Appl. No. 12/774,380 dated Jan. 8, 2013.
Final Office Action from related U.S. Appl. No. 12/880,965 dated Jan. 11, 2013.
Final Office Action from related U.S. Appl. No. 12/881,004 dated Mar. 7, 2013.
Final Office Action from related U.S. Appl. No. 12/851,036 dated Feb. 26, 2013.
Final Office Action from related U.S. Appl. No. 12/851,075 dated Mar. 5, 2013.
Non-Final Office Action from related U.S. Appl. No. 12/774,221 dated Feb. 26, 2013.
Final Office Action from related U.S. Appl. No. 12/850,832 dated Feb. 25, 2013.
Final Office Action from related U.S. Appl. No. 12/850,866 dated Mar. 29, 2013.
Final Office Action from related U.S. Appl. No. 12/850,945 dated Apr. 26, 2013.
Non-Final Office Action from related U.S. Appl. No. 12/880,668 dated Jun. 10, 2013.
Final Office Action from related U.S. Appl. No. 12/774,321 dated Jun. 27, 2013.
Non-Final Office Action from related U.S. Appl. No. 12/850,945 dated Aug. 27, 2013.
Final Office Action from related U.S. Appl. No. 12/774,380 dated Jun. 11, 2013.
Final Office Action from related U.S. Appl. No. 12/880,851 dated Sep. 10, 2013.
Non-Final Office Action from related U.S. Appl. No. 12/881,031 dated Sep. 10, 2013.

\* cited by examiner

US 9,110,517 B2

SYSTEM AND METHOD FOR GENERATING SCREEN POINTING INFORMATION IN A TELEVISION

CROSS-REFERENCE TO RELATED APPLICATIONS/INCORPORATION BY REFERENCE

This patent application is related to and claims priority from provisional patent application Ser. No. 61/242,234 filed Sep. 14, 2009, and titled "TELEVISION SYSTEM," the contents of which are hereby incorporated herein by reference in their entirety. This patent application is also related to U.S. patent application Ser. No. 12/774,221, filed concurrently with, titled "SYSTEM AND METHOD FOR GENERATING TELEVISION SCREEN POINTING INFORMATION USING AN EXTERNAL RECEIVER"; and U.S. patent application Ser. No. 12/774,321, filed concurrently herewith, titled "SYSTEM AND METHOD FOR GENERATING SCREEN POINTING INFORMATION IN A TELEVISION CONTROL DEVICE". The contents of each of the above-mentioned applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Present televisions are incapable of providing pointing information to television program viewers. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method, in a television, for generating screen pointing information, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
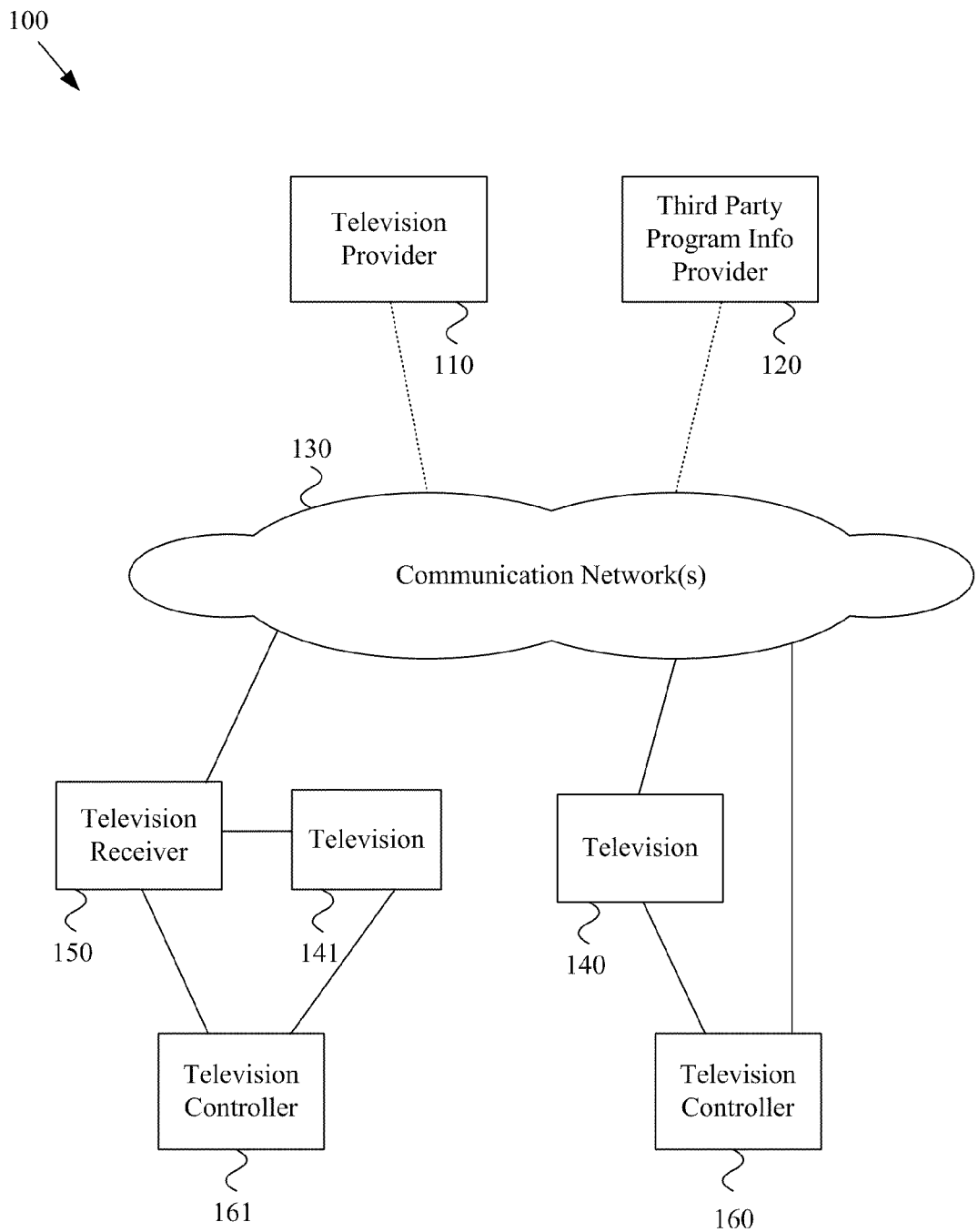
FIG. 1 is a diagram illustrating an exemplary television system in accordance with various aspects of the present invention.

The following discussion will refer to various communication modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various television modules. It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software sub-modules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a portable communication device, television, television controller, television provider, television programming provider, television receiver, video recording device, etc.) may communicate with other systems. For example and without limitation, a communication network may comprise a cable and/or satellite television communication network, a cellular communication network, a wireless metropolitan area network (WMAN), a wireless local area network (WLAN), a wireless personal area network (WPAN), any home or premises communication network, etc. A particular communication network may, for example, generally have a corresponding communication protocol according to which a communication device may communicate with the communication network. Unless so claimed, the scope of various aspects of the present invention should not be limited by characteristics of a particular type of communication network.

The following discussion will at times refer to an on-screen pointing location. Such a pointing location refers to a location on the television screen to which a user (either directly or with a pointing device) is pointing. Such a pointing location is to be distinguished from other types of on-screen location identification, such as, for example, using arrow keys and/or a mouse to move a cursor or to traverse blocks (e.g., on an on-screen program guide) without pointing.

Additionally, the following discussion will at times refer to television programming. Such television programming generally includes various types of television programming (e.g., television programs, news programs, sports programs, music television, movies, television series programs and/or associated advertisements, educational programs, live or recorded, broadcast/multicast/unicast, etc.). Such television programming video content is to be distinguished from other non-programming video content that may be displayed on a television screen (e.g., an electronic program guide, user interface menu, a television set-up menu, a typical web page, a document, a graphical video game, etc.). Various aspects of the present invention may, for example, comprise determining an on-screen pointing location during the presentation of television programming on the screen of the television.

Turning first to FIG. 1, such figure is a diagram illustrating a non-limiting exemplary television system 100 in accordance with various aspects of the present invention. The exemplary system 100 includes a television provider 110. The television provider 110 may, for example, comprise a television network company, a cable company, a movie-providing company, a news company, an educational institution, etc. The television provider 110 may, for example, be an original source of television programming (or related information). Also for example, the television provider 110 may be a communication company that provides programming distribution services (e.g., a cable television company, a satellite television company, a telecommunication company, a data network provider, etc.). The television provider 110 may, for example, provide programming and non-programming information and/or video content. The television provider 110 may, for example, provide information related to a television program (e.g., information describing or otherwise related to selectable objects in programming, etc.).

The exemplary television system 100 may also include a third party program information provider 120. Such a provider may, for example, provide information related to a television program. Such information may, for example, comprise information describing selectable objects in programming, program guide information, etc.

The exemplary television system 100 may include one or more communication networks (e.g., the communication network(s) 130). The exemplary communication network 130 may comprise characteristics of any of a variety of types of communication networks over which video content and/or information related to video content may be communicated. For example and without limitation, the communication network 130 may compare characteristics of a cable television network, a satellite television network, a telecommunication network, the Internet, a local area network (LAN), a personal area network (PAN), a metropolitan area network (MAN), any of a variety of different types of home networks, etc.

The exemplary television system 100 may include a first television 140. Such a first television 140 may, for example, comprise networking capability enabling such television 140 to communicate directly with the communication network 130. For example, the first television 140 may comprise one or more embedded television receivers or transceivers (e.g., a cable television receiver, satellite television transceiver, Internet modem, etc.). Also for example, the first television 140 may comprise one or more recording devices (e.g., for recording and/or playing back video content, television programming, etc.).

The exemplary television system 100 may include a first television controller 160. Such a first television controller 160 may, for example, operate to control operation of the first television 140. The first television controller 160 may comprise characteristics of any of a variety of television controlling devices. For example and without limitation, the first television controller 160 may comprise characteristics of a dedicated television control device, a universal remote control, a cellular telephone or personal computing device with television control capability, etc.

The first television controller 160 may, for example, transmit signals directly to the first television 140 to control operation of the first television 140. The first television controller 160 may also, for example, operate to transmit signals (e.g., via the communication network 130) to the television provider 110 to control video content being provided to the first television 140, or to conduct other transactions (e.g., business transactions, etc.).

As will be discussed in more detail later, various aspects of the present invention include a user pointing to a location on a television screen (e.g., pointing to an object or person presented in television programming). In such a scenario, the user may perform such pointing in any of a variety of manners. One of such exemplary manners includes pointing with a television control device. The first television controller 160 provides a non-limiting example of a device that a user may utilize to point to an on-screen location.

The exemplary television system 100 may also include a television receiver 150. The television receiver may, for example, operate to provide a communication link between a television and/or television controller and a communication network and/or information provider. For example, the television receiver 150 may operate to provide a communication link between the second television 141 and the communication network 130, or between the second television 141 and the television provider 110 (and/or third party program information provider 120) via the communication network 130.

The television receiver 150 may comprise characteristics of any of a variety of types of television receivers. For example and without limitation, the television receiver 150 may comprise characteristics of a cable television receiver, a satellite television receiver, etc. Also for example, the television receiver 150 may comprise a data communication network modem for data network communications (e.g., with the Internet, a LAN, PAN, MAN, telecommunication network, etc.). The television receiver 150 may also, for example, comprise recording capability (e.g., programming recording and playback, etc.).

The exemplary television system 100 may include a second television controller 161. Such a second television controller 161 may, for example, operate to control operation of the second television 141 and the television receiver 150. The second television controller 161 may comprise characteristics of any of a variety of television controlling devices. For example and without limitation, the second television controller 161 may comprise characteristics of a dedicated television control device, a universal remote control, a cellular telephone or personal computing device with television control capability, etc.

The second television controller 161 may, for example, transmit signals directly to the second television 141 to control operation of the second television 141. The second television controller 161 may, for example, transmit signals directly to the television receiver 150 to control operation of the television receiver 150. The second television controller 161 may additionally, for example, operate to transmit signals (e.g., via the television receiver 150 and the communication network 130) to the television provider 110 to control video content being provided to the television receiver 150, or to conduct other transactions (e.g., business transactions, etc.).

As will be discussed in more detail later, various aspects of the present invention include a user pointing to a location on a television screen (e.g., point to an object or person presented in television programming). In such a scenario, the user may perform such pointing in any of a variety of manners. One of such exemplary manners includes pointing with a television control device. The second television controller 161 provides one non-limiting example of a device that a user may utilize to point to an on-screen location.

The exemplary television system 100 was provided to provide a non-limiting illustrative foundation for discussion of various aspects of the present invention. Thus, the scope of various aspects of the present invention should not be limited by any characteristics of the exemplary television system 100 unless explicitly claimed.

Figure 2:
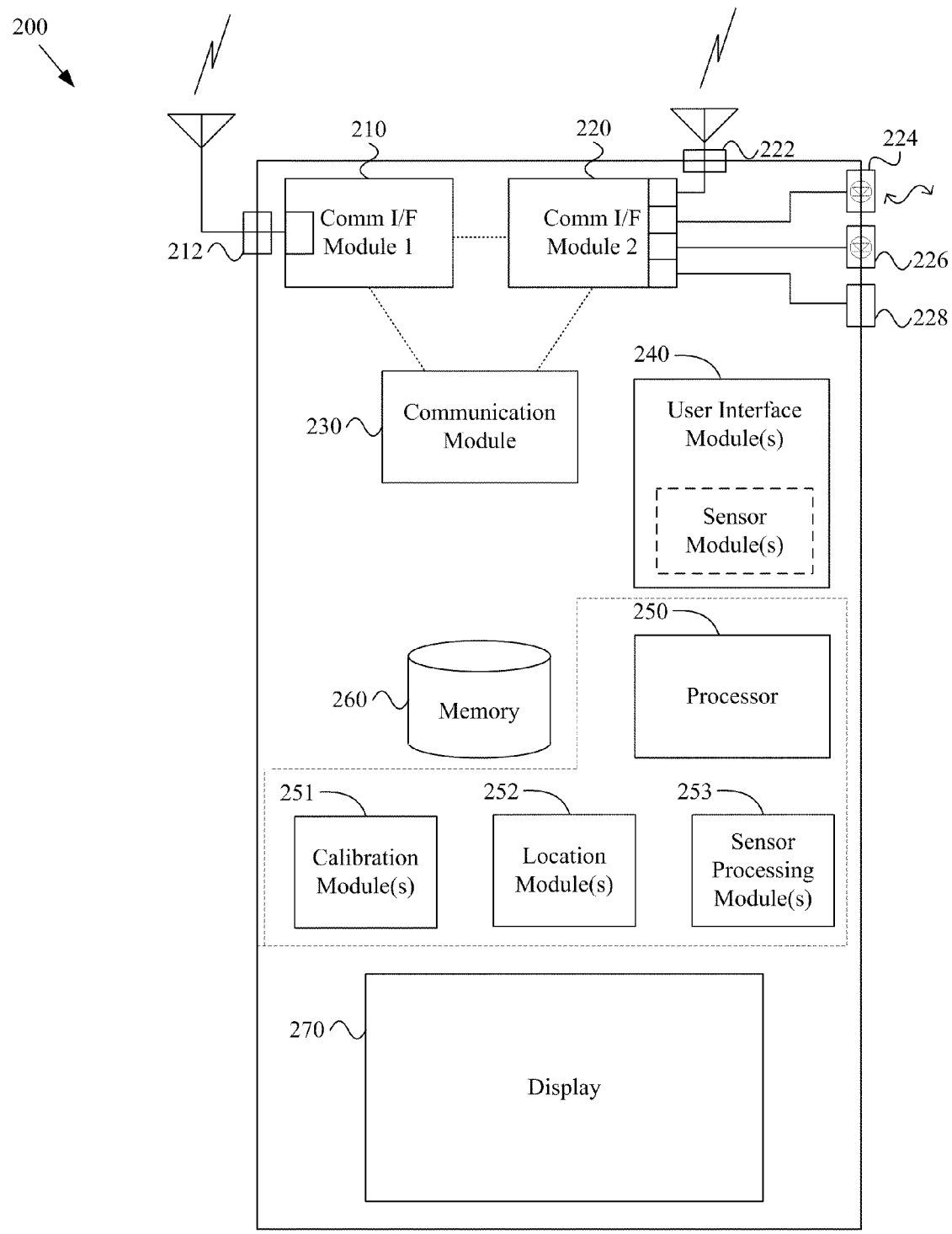
FIG. 2 is a diagram illustrating an exemplary television in accordance with various aspects of the present invention.

Turning next to FIG. 2, such figure is a diagram illustrating an exemplary television 200 in accordance with various aspects of the present invention. The exemplary television 200 may, for example, share any or all characteristics with the exemplary televisions 140, 141 illustrated in FIG. 1 and discussed previously.

The exemplary television 200 includes a first communication interface module 210. The first communication interface module 210 may, for example, operate to communicate over any of a variety of communication media and utilizing any of a variety of communication protocols. For example, though the first communication interface module 210 is illustrated coupled to a wireless RF antenna via a wireless port 212, the wireless medium is merely illustrative and non-limiting. The first communication interface module 210 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the first communication module 210 may operate to communicate with local sources of television video content (e.g., video recorders, receivers, gaming devices, etc.). Additionally, for example, the first communication module 210 may operate to communicate with a television controller (e.g., directly or via one or more intermediate communication networks).

The exemplary television 200 includes a second communication interface module 220. The second communication interface module 220 may, for example, operate to communicate over any of a variety of communication media and utilizing any of a variety of communication protocols. For example, the second communication interface module 220 may communicate via a wireless RF communication port 222 and antenna, or may communicate via a non-tethered optical communication port 224 (e.g., utilizing laser diodes, photodiodes, etc.). Also for example, the second communication interface module 220 may communicate via a tethered optical communication port 226 (e.g., utilizing a fiber optic cable), or may communicate via a wired communication port 228 (e.g., utilizing coaxial cable, twisted pair, HDMI cable, Ethernet cable, any of a variety of wired component and/or composite video connections, etc.). The second communication interface module 220 may, for example, operate to communicate with one or more communication networks (e.g., cable television networks, satellite television networks, telecommunication networks, the Internet, local area networks, personal area networks, metropolitan area networks, etc.) via which television video content and/or other data is communicated. Also for example, the second communication module 220 may operate to communicate with local sources of television video content (e.g., video recorders, receivers, gaming devices, etc.). Additionally, for example, the second communication module 220 may operate to communicate with a television controller (e.g., directly or via one or more intervening communication networks).

The exemplary television 200 may also comprise additional communication interface modules, which are not illustrated. Such additional communication interface modules may, for example, share any or all aspects with the first 210 and second 220 communication interface modules discussed above.

The exemplary television 200 may also comprise a communication module 230. The communication module 230 may, for example, operate to control and/or coordinate operation of the first communication interface module 210 and the second communication interface module 220 (and/or additional communication interface modules as needed). The communication module 230 may, for example, provide a convenient communication interface by which other components of the television 200 may utilize the first 210 and second 220 communication interface modules. Additionally, for example, in an exemplary scenario where a plurality of communication interface modules are sharing a medium and/or network, the communication module 230 may coordinate communications to reduce collisions and/or other interference between the communication interface modules.

The exemplary television 200 may additionally comprise one or more user interface modules 240. The user interface module 240 may generally operate to provide user interface functionality to a user of the television 200. For example, and without limitation, the user interface module 240 may operate to provide for user control of any or all standard television commands (e.g., channel control, volume control, on/off, screen settings, input selection, etc.). The user interface module 240 may, for example, operate and/or respond to user commands utilizing user interface features disposed on the television (e.g., buttons, etc.) and may also utilize the communication module 230 (and/or first 210 and second 220 communication interface modules) to communicate with a television controller (e.g., a dedicated television remote control, a universal remote control, a cellular telephone, personal computing device, gaming controller, etc.).

The user interface module 240 may also operate to interface with and/or control operation of any of a variety of sensors that may be utilized to ascertain an on-screen pointing location. Non-limiting examples of such sensors will be provided later (e.g., in the discussion of FIGS. 3-6 and elsewhere herein). For example and without limitation, the user interface module 240 may operate to receive signals associated with respective sensors (e.g., raw or processed signals directly from the sensors, through intermediate devices, via the communication interface modules 210, 220, etc.). Also for example, in scenarios in which such sensors are active sensors (as opposed to purely passive sensors), the user interface module 240 may operate to control the transmission of signals (e.g., RF signals, optical signals, acoustic signals, etc.) from such sensors.

The exemplary television 200 may comprise one or more processors 250. The processor 250 may, for example, comprise a general purpose processor, digital signal processor, application-specific processor, microcontroller, microprocessor, etc. For example, the processor 250 may operate in accordance with software (or firmware) instructions. As mentioned previously, any or all functionality discussed herein may be performed by a processor executing instructions. For example, though various modules are illustrated as separate blocks or modules in FIG. 3, such illustrative modules, or a portion thereof, may be implemented by the processor 250.

The exemplary television 200 may comprise one or more memories 260. As discussed above, various aspects may be performed by one or more processors executing instructions. Such instructions may, for example, be stored in the one or more memories 260. Such memory 260 may, for example, comprise characteristics of any of a variety of types of memory. For example and without limitation, such memory 260 may comprise one or more memory chips (e.g., ROM, RAM, EPROM, EEPROM, flash memory, one-time-programmable OTP memory, etc.), hard drive memory, CD memory, DVD memory, etc.

The exemplary television 200 may comprise one or more calibration modules 251 that operate to perform various calibration activities. Examples of such calibration activities will be provided later in this discussion. Briefly, such calibration activities may, for example, comprise interacting with a user and/or user pointing device to determine sensor signals under known circumstances (e.g., determine sensor signals in response to known screen pointing circumstances), and processing such sensor signals to develop algorithms (e.g., transformation matrices, static positional equations, etc.) to determine screen pointing location based on sensor signals received during normal operation. As will also be discussed later, such calibration may also be utilized to establish signal gain patterns utilized in determining pointing location.

The exemplary television 200 may comprise one or more location-determining modules 252. For example, as will be discussed later, various on-screen pointing location determinations may comprise processing location information. As a non-limiting example, knowing the location of a user (including the location of a pointing device being utilized by the user) may simplify the solution of various pointing direction determinations. For example, knowing exactly where a pointing device is located (e.g., in three-dimensional space) or where a pointing device is located along a line (e.g., knowing device location in two-dimensional space or land surface coordinates) relative to the television screen may remove a number of unknown variables from applicable positional equations. Note that such positional information may, in various exemplary scenarios, also comprise orientation information for a pointing device (e.g., yaw, pitch and roll). Such orientation information may be determined in various manners (e.g., through gyroscopic means, sensor alignment with known references, etc.).

The location-determining module 252 may operate to determine user (or pointing device) location in any of a variety of manners. For example and without limitation, the location-determining module 252 may operate to receive location information from the pointing device (e.g., via one of the communication interface modules 210, 220). For example, such a pointing device may comprise positioning system capability (e.g., global positioning system, assisted GPS, cellular or other triangulation systems, etc.) and communicate information describing the position of the pointing device to the television 200.

Also for example, the location-determining module 252 may (e.g., via the user interface modules 240) utilize sensor signals to determine the position (which may include orientation) of the pointing device (or user thereof). For example, a signal from a pointing device may arrive at different sensors at different times (or at different phases). Such temporal or phase differences may be processed to determine the location of the pointing device relative to the known location of such sensors. Further for example, the location-determining module 252 may operate to communicate pointing device location information with an external system that operates to determine the location of the pointing device. Such an external system may, for example, comprise a cellular telephony triangulation system, a home or premises-based triangulation system, a global positioning system, an assisted global positioning system, etc.

The exemplary television 200 may also comprise one or more sensor processing module(s) 253. As will be explained below, the sensor processing module 253 may operate to receive sensor information (e.g., from the user interface module(s) 240) and process such received sensor information to determine a location on the television screen to which a user is pointing. Various examples of such processing will be provided below. Briefly, such processing may, for example, comprise selecting a sensor with the strongest signal, interpolating between a plurality of sensors, interpolating between a plurality of sensors having strongest signals, determining gain pattern intersections, etc. Various aspects of the present invention comprise, for example, determining on-screen pointing location during presentation of television programming (e.g., programming received from a television broadcaster, video recording device, etc.).

Various aspects of the present invention will now be illustrated by way of non-limiting example. Throughout the following discussion, reference will continue to be made to the various modules of the television 200 illustrated in FIG. 2. It should be noted that the following non-limiting examples provide specific examples of various aspects, and as such, the scope of various aspects of the present invention should not be limited by characteristics of any of the specific examples, unless specifically claimed.

Figure 3:
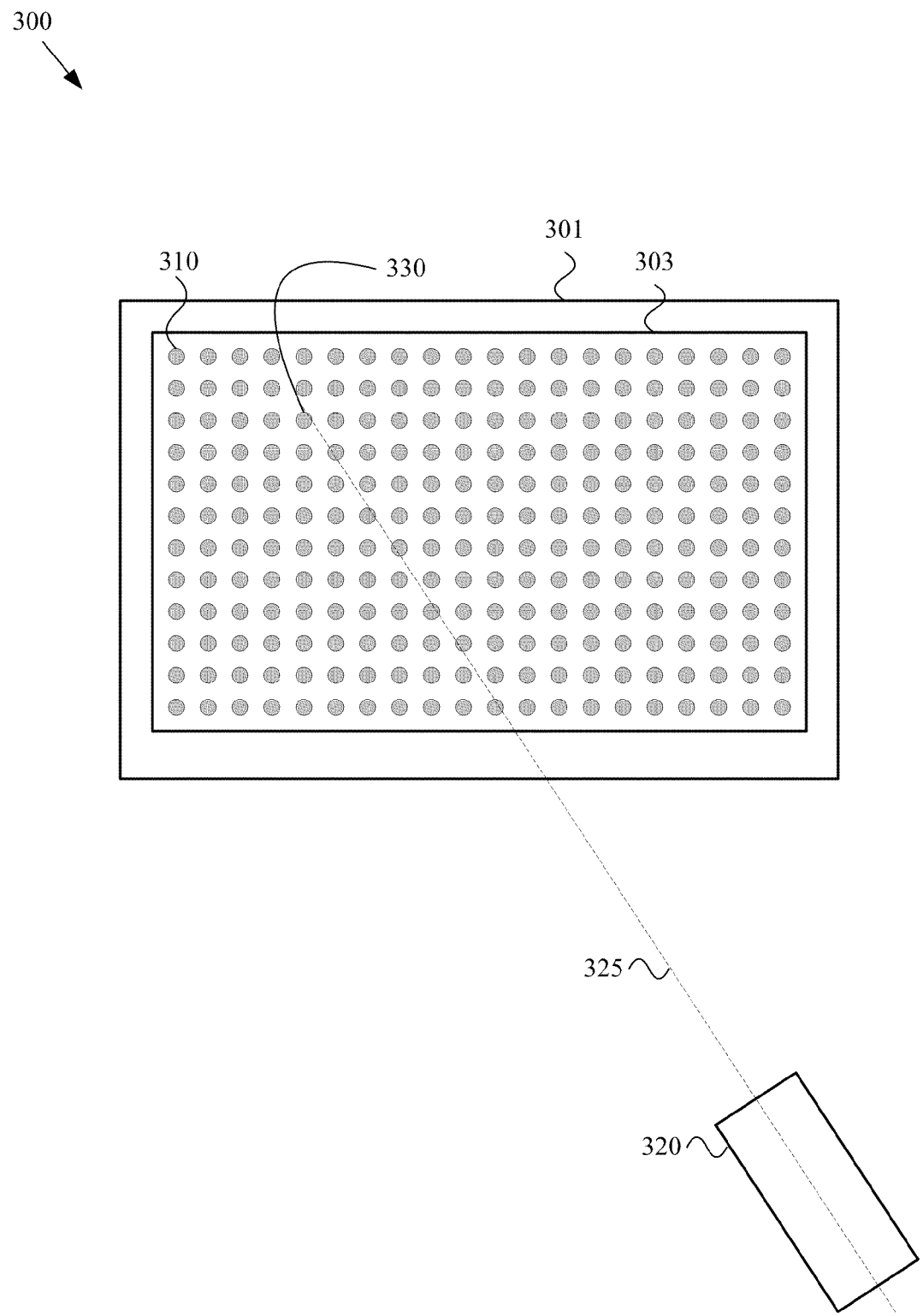
FIG. 3 is a diagram illustrating an exemplary television system with on-screen television sensors in accordance with various aspects of the present invention.

FIG. 3 is a diagram illustrating an exemplary television system 300 with on-screen television sensors in accordance with various aspects of the present invention. The television system 300 includes a television 301 comprising a television screen 303. The television system 300 also includes a television controller 320 (or other pointing device) pointing to an on-screen pointing location 330 along a line 325 between the television controller 320 and the on-screen pointing location 330.

The exemplary television screen 303 comprises an array of sensors integrated into the television screen 303. One of such sensors is labeled sensor 310. Any of a variety of sensor types may be utilized, non-limiting examples of which include light sensors or photo detectors (e.g., photo diodes) and RF sensors (e.g., antenna elements or loops).

The array of sensors may be integrated in the television screen 303 in any of a variety of manners, non-limiting examples of which will now be provided. For example, the television screen 303 may comprise an array of liquid crystal display (LCD) pixels for presenting video media to a user. An array of photo diodes and/or antenna elements may be integrated between or behind LCD pixels. For example, every LCD pixel may be associated with a corresponding photo diode and/or antenna element, or every NxM block of LCD pixels may be associated with a corresponding photo diode or antenna element.

As a non-limiting example, an array of photo diodes and/or RF antenna elements may be formed into a substrate beneath or behind transparent LCD substrates. As another example, a photo diode array and/or antenna element array may be interposed between or behind an array of LCD thin film transistors. Also for example, an array of photo diodes and/or RF antenna elements (or other sensors) may be incorporated into a transparent screen overlay.

In a photo detector implementation, passive photo detectors may receive varying amounts of respective light energy depending on the pointing direction of a light source aimed at the screen. Also for example, received signals (e.g., pulsed signals) may arrive at different sensors at different respective times/phases (e.g., being indicative of relative position and/or pointing direction, which may also be utilized in a pointing determination). In such a photo detector implementation (e.g., utilizing photo diodes), photo detectors may, for example, be tuned to react to particular light frequencies to reduce interference from output pixel light and/or associated reflections, ambient light, etc. As a non-limiting example, photo diodes may be tuned to detect light that is not visible to the human eye, visible light frequencies that are relatively rare, light patterns that are unlikely to occur in a television program (e.g., particular pulse codes), etc.

In an antenna element implementation, an array of antenna elements may be formed on a substrate and placed behind light producing and/or filtering elements in the LCD screen (e.g., so as to avoid interfering with emitted light) or may be formed on a transparent substrate within or in front of the lighted region of the LCD display (e.g., utilizing microscopic antenna elements that are too small to significantly interfere with light emitted from the display).

In an RF antenna implementation, passive antennas (or elements of an overall antenna matrix) may receive varying amounts of respective RF energy depending on the pointing direction of a directional RF source aimed at the screen. Also for example, received signals (e.g., pulsed signals) may arrive at different antennas at different respective times/phases (e.g., being indicative of relative position and/or pointing direction, which may also be utilized in a pointing determination)

In an exemplary scenario, a user may point a pointing device (e.g., a remote controller, a laser pointer, directional RF transmitter, specifically designed eyewear, a mobile computing device, a mobile communication device, a gesture tracking device or glove, etc.) at the television screen 303, where the pointing device directs transmitted energy (e.g., light energy, RF energy, acoustic energy, etc.) at a particular location on the television screen 303 to which the pointing device is being pointed. Note that such transmitted energy will likely be transmitted directionally and be associated with an intensity or gain pattern with the highest intensity likely at the center of the pattern (i.e., along the pointing line 325) and decreasing as a function of angle from the center of the pattern (or distance on the screen from the on-screen pointing location).

In such an exemplary scenario, each sensor of the array of sensors integrated into the screen 303 will likely receive some amount of energy. For example, the sensor nearest the screen pointing location 330 (i.e., along the pointing line 325) will likely receive the highest amount of energy, sensors adjacent to the screen pointing location 330 will likely receive a next highest range of energy, and sensors away from the pointing location 330 will likely receive progressively less amounts of energy from the pointing device 320, as a function of distance from the pointing location 330, until such energy is lost in the noise floor.

In such an exemplary scenario, the user interface module 240 may receive signals indicative of the energy received by the sensors of the sensor array. The user interface module 240 may then, for example, provide information of such received sensor signals to the sensor processing module 253 for processing. The sensor processing module 253 may then, for example, operate to process such information to determine the screen pointing location. The sensor processing module 253 may perform such processing in any of a variety of manners, non-limiting examples of which will be provided below.

For example, the sensor processing module 253 may operate to select the sensor with the highest received energy and determine that the location of such selected sensor is the on-screen pointing location. For example, in an exemplary scenario where the spatial resolution of screen-integrated sensors is relatively fine, such operation may reliably yield a desired level of accuracy without undue processing overhead.

In another example, the sensor processing module 253 may operate to select the sensor with the highest received energy and a plurality of sensors adjacent to such sensor. Then, for example, the sensor processing module 253 may interpolate between the locations of such sensors (e.g., based, at least in part, on weighting). For example, in a first dimension in which a sensor to the right of the highest energy sensor has a higher received energy than a sensor to the left of the highest energy sensor, the sensor processing module 253 may determine that the pointing location is to the right of the highest energy sensor. How much distance to the right may, for example, be determined as a function of the ratio between respective energies received by the right and left sensors. Such calculation may, for example, be a linear or non-linear calculation. Such calculation may also, for example, consider the expected energy pattern of a transmitting pointing device (e.g., in a scenario where energy fall-off is logarithmic as opposed to linear).

In an additional example, the sensor processing module 253 may operate to select all sensors receiving a threshold amount of energy (e.g., an absolute threshold level, a threshold level relative to the highest energy sensor, etc.). Then, for example, the sensor processing module 253 may interpolate between the locations of such sensors (e.g., based, at least in part, on respective energy weighting). For example, the sensor processing module 253 may perform non-linear splining between sensors in a horizontal direction with sensor location on a first axis and sensor energy on a second axis. The sensor processing module 253 may then operate to select the point on the sensor location axis corresponding to the peak sensor energy on the vertical axis. Such splining and selecting may then be repeated in the vertical direction. Alternatively for example, the sensor processing module 253 may operate to perform multi-dimensional splining to create a surface based on sensor energy and select the highest point on such surface and the corresponding screen coordinates of such surface.

In a further example, the sensor processing module 253 may operate to select a first sensor (e.g., the sensor with the highest received energy). Then, for example, the sensor processing module 253 may utilize information of the relative distance between the selected sensor and the pointing device, information of the gain pattern for the signal transmitted from the pointing device to the selected sensor, and calibration information to determine where the pointing device may be pointed in order for the sensor to receive such energy. For example, this may result in a first closed figure (e.g., a circle, cloverleaf, etc.) drawn around the sensor. Then the sensor processing module 253 may repeat the procedure for a second sensor (e.g., a sensor with the second highest received energy), resulting in a second closed figure. The sensor processing module 253 may then, for example, determine the point(s) of intersection between the first and second figures. If only one point of intersection lies within the border of the screen, then such point of intersection may be utilized as an estimate of the pointing location. If, however, there are two potentially significant points of intersection (or more depending on the figures), then the sensor processing module 253 may repeat the procedure for a third sensor (e.g., the sensor with the third highest energy, a sensor generally along the line perpendicular to a line segment between the first and second sensors, etc.) and determine a point nearest the intersection of the first, second and third closed figures. Such a point of intersection may then be utilized as an estimate of the pointing location.

The above-mentioned examples of screen-integrated sensors and related pointing location determinations were presented as exemplary illustrations. Though the above-mentioned examples generally discuss light and/or RF energy sensors, other types of sensors may also be integrated into a television screen. For example and without limitation, the sensors may comprise acoustic sensors that operate to sense acoustic energy (e.g., directed acoustic energy directed to a pointing location on the screen). For example, such directed acoustic energy may be formed at frequencies beyond the range of human hearing (e.g., and at frequencies beyond the range of pet hearing as well).

Figure 4:
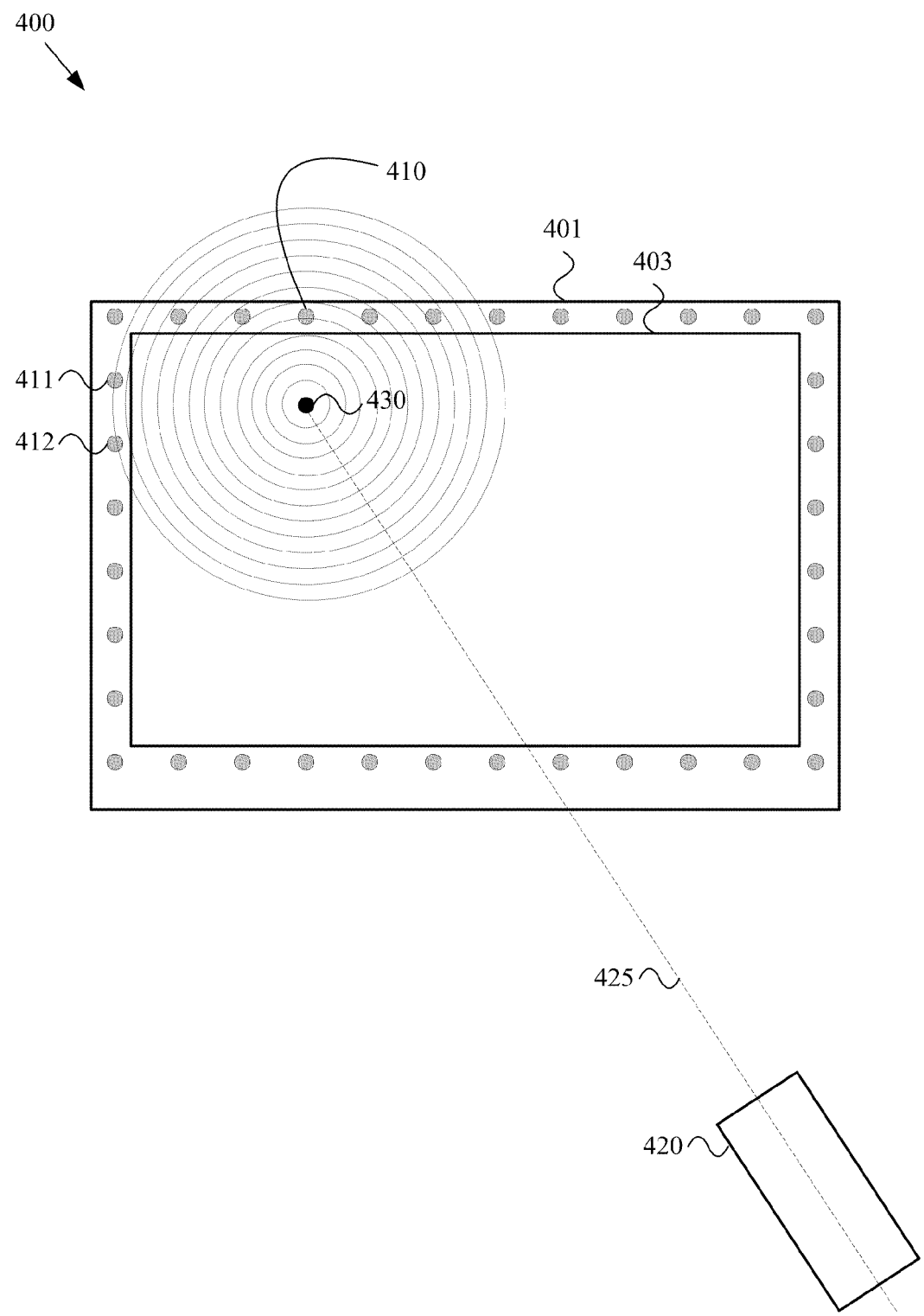
FIG. 4 is a diagram illustrating an exemplary television system with off-screen television sensors in accordance with various aspects of the present invention.

In addition to various television configurations in which sensors are integrated into the television screen, sensors may be incorporated into the television off-screen. Such sensors may, for example, be incorporated in a border around the screen. For example and without limitation FIG. 4 is a diagram illustrating an exemplary television system 400 with off-screen television sensors in accordance with various aspects of the present invention. The television system 400 includes a television 401 comprising a television screen 403. The television system 400 also includes a television controller 420 (or other pointing device) pointing to an on-screen pointing location 430 along a pointing line 425 between the television controller 420 and the on-screen pointing location 430.

The exemplary television 401 comprises an array of sensors integrated into the television 401 around the border of the screen 403. Three of such sensors are labeled 410, 411 and 412. As discussed above, any of a variety of sensor types may be utilized, non-limiting examples of which include light sensors or photo detectors (e.g., photo diodes), RF sensors (e.g., antenna elements), acoustic sensors (e.g., microphones), etc.

The array of sensors may be integrated around the television screen 403 in any of a variety of manners. For example, such sensors may be integrated in a border of the television screen 403 that is not used for outputting video content. Such a configuration may, for example, avoid sensor interference with video content being displayed on the screen. Also for example, as illustrated in FIG. 4, such sensors may be mounted to a border material of the television 401.

For example, an array of photo detectors (e.g., photo diodes) and/or antenna elements (e.g., individual antennas or elements of an antenna array, for example, a phased array) may be incorporated into a border of the television 401 around the screen 403. For example, every screen pixel row and/or column may be associated with a pair of corresponding photo diodes and/or antenna elements, or every NxM block of screen pixels may be associated with one or more corresponding photo diodes or antenna elements (e.g., a row and column sensor, two row and two column elements, etc.).

In a photo detector implementation, passive photo detectors may receive varying amounts of respective light energy depending on the pointing direction of a light source pointed at the screen. Also for example, received signals (e.g., pulsed signals) may arrive at different sensors at different respective times/phases (e.g., being indicative of relative position and/or pointing direction, which may also be utilized in a pointing determination). In such a photo detector implementation (e.g., utilizing photo diodes), photo detectors may, for example, be tuned to react to particular light frequencies to reduce interference from output pixel light and/or associated reflections. As a non-limiting example, photo diodes may be tuned to detect light that is not visible to the human eye, visible light frequencies that are relatively rare, light patterns that are unlikely to occur in a television program (e.g., particular pulse codes), etc. In one example, the photo detectors integrated with the television body off-screen may comprise photo diodes that operate to detect energy from a laser pointer or directed infrared energy from a television controller or other pointing device.

In an antenna element implementation, an array of antenna elements may be positioned around the border of the screen 403. In an RF antenna implementation, passive antennas (or elements of an overall antenna matrix) may receive varying amounts of respective RF energy depending on the pointing direction of a directional RF source aimed at the screen. Also for example, received signals (e.g., pulsed signals) may arrive at different antennas at different respective times/phases (e.g., being indicative of relative position and/or pointing direction, which may also be utilized in a pointing determination).

In an exemplary scenario, a user may point a pointing device (e.g., a remote controller, a laser pointer, directional RF transmitter, specifically designed eyewear, a mobile computing device, a mobile communication device, a gesture tracking device or glove, etc.) at the television screen 403, where the pointing device directs transmitted energy (e.g., light and/or RF energy and/or acoustic energy) at a particular location on the television screen 403 to which the device is being pointed. Note that such transmitted energy will likely be transmitted directionally and be associated with an intensity or gain pattern with the highest intensity likely at the center of the pattern (i.e., along the pointing line 425) and decreasing as a function of angle from the center of the pattern. Such a gain pattern is generally represented in FIG. 4 by the concentric circles around the on-screen pointing location 430. Note, however, that in practice such a gain pattern is likely to be more complex than the illustrated pattern (e.g., including lobes with respective peaks and nulls).

In such an exemplary scenario, each sensor of the sensors integrated into the television around the border of the screen 403 will likely receive some amount of energy. For example, along a particular axis the sensor nearest the screen pointing location 430 (i.e., along the pointing line 425) will likely receive the highest amount of energy, sensors along the particular axis adjacent to the screen pointing location 430 will likely receive a next highest range of energy, and sensors away from the pointing location 430 will likely receive progressively less amounts of energy from the pointing device 420, as a function of distance from the pointing location 430, until such energy is lost in the noise floor.

For example, along the horizontal axis, sensor 410 is closest to the pointing location 430 and will likely receive the highest energy, with sensors adjacent to the left and right of sensor 410 receiving the next highest amounts of energy, and so on. Also, along the vertical axis, sensors 411 and 412 will likely receive close to the highest amount of energy, with sensors above and below such sensors 411, 412 receiving the next highest amounts of energy and so on.

In such an exemplary scenario, the user interface module 240 may receive signals indicative of the energy received by the sensors of the television. The user interface module 240 may then, for example, provide information of such received sensor signals to the sensor processing module 253 for processing. The sensor processing module 253 may then, for example, operate to process such information to determine the screen pointing location. The sensor processing module 253 may perform such processing in any of a variety of manners, non-limiting examples of which will be provided below.

For example, the sensor processing module 253 may operate to select the sensor with the highest received energy along each of the horizontal and vertical axes and determine that the respective locations of such selected sensors correspond to the horizontal and vertical coordinates of the on-screen pointing location. For example, in an exemplary scenario where the spatial resolution of screen border sensors is relatively fine, such operation may reliably yield a desired level of accuracy without undue processing overhead. For example, the sensor processing module 253 may determine that sensors 410 and 411 have the highest received energy for the horizontal and vertical axes, respectively, and thus determine that the on-screen pointing location is represented in the horizontal axis by the horizontal location of the sensor 410 and represented in the vertical axis by the vertical location of the sensor 411. Note that in scenarios where two sensors have relatively similar energy levels (e.g., as might occur at sensors 411 and 412, the sensor processing module 253 may select a vertical midpoint between such sensors.

In another example, the sensor processing module 253 may operate to select, for each screen axis, the sensor with the highest received energy and a plurality of sensors adjacent to such sensor. Then, for example, the sensor processing module 253 may interpolate between the locations of such sensors (e.g., based, at least in part, on weighting). For example, in the horizontal dimension in which a sensor to the right of the highest energy sensor 410 has a higher received energy than a sensor to the left of the highest energy sensor 410, the sensor processing module 253 may determine that the pointing location along the horizontal axis is to the right of the highest energy sensor 410. How much distance to the right may, for example, be determined as a function of the ratio between respective energies received by the right and left sensors. Such calculation may, for example, be a linear or non-linear calculation. Such calculation may also, for example, consider the expected energy pattern of a transmitting pointing device (e.g., in a scenario where energy fall-off is logarithmic as opposed to linear). The sensor processing module 253 may then, for example, repeat such operation in the vertical direction.

In another example, the sensor processing module 253 may operate to select all sensors in each of the axes receiving a threshold amount of energy (e.g., an absolute threshold level, a threshold level relative to the highest energy sensor, etc.). Then, for example, the sensor processing module 253 may interpolate between the locations of such sensors (e.g., based, at least in part, on respective energy weighting). For example, the sensor processing module 253 may perform non-linear splining between sensors in a horizontal direction with sensor location on a first axis and sensor energy on a second axis. The sensor processing module 253 may then operate to select the point on the sensor location axis corresponding to the peak sensor energy on the vertical axis. Such splining and selecting may then be repeated in the vertical screen direction. Alternatively for example, the sensor processing module 253 may operate to perform multi-dimensional splining to create a surface based on sensor energy and select the highest point on such surface and the corresponding screen coordinates of such surface.

Figure 5:
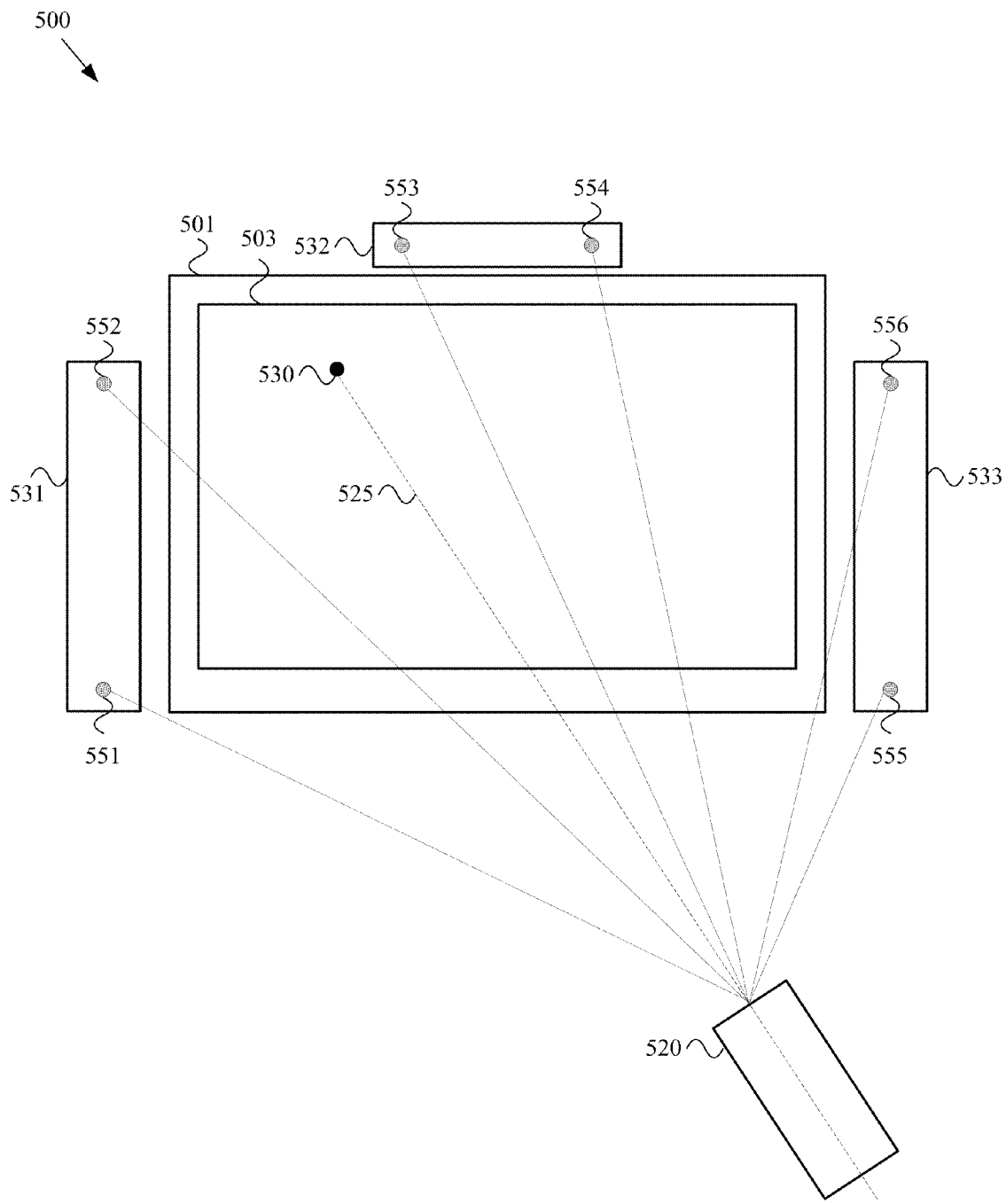
FIG. 5 is a diagram illustrating an exemplary television system with off-television sensors in accordance with various aspects of the present invention.

In addition to various television configurations in which sensors are integrated into the television off-screen or off the video presentation portion of the screen, sensors may be incorporated into the television system off-television. Such sensors may, for example, be incorporated in other components of a television system besides the television. For example and without limitation FIG. 5 is a diagram illustrating an exemplary television system 500 with off-television sensors in accordance with various aspects of the present invention. The television system 500 includes a television 501 comprising a television screen 503. The television system 500 also includes a television controller 520 (or other pointing device) pointing to an on-screen pointing location 530 along a pointing line 525 between the television controller 520 and the on-screen pointing location 530.

The exemplary television system 500 comprises an array of sensors integrated into audio speaker components (e.g., surround sound speakers) positioned around the television 501. For example, the television system 500 comprises a left speaker 531 comprising a top sensor 552 and a bottom sensor 551. Also for example, the television system 500 comprises a right speaker 533 comprising a top sensor 556 and a bottom sensor 555. Additionally for example, the television system comprises a center speaker 532 comprising a left sensor 553 and a right sensor 554. As discussed above, any of a variety of sensor types may be utilized, non-limiting examples of which include light sensors or photo detectors (e.g., photo diodes), RF sensors (e.g., antenna elements), acoustic sensors (e.g., microphones), etc. Note that the audio speaker component example discussed herein is merely illustrative and that such sensors may be installed in any of a variety of locations (e.g., dedicated sensor boxes, attached to furniture, etc.).

The array of sensors may be positioned around the television 501 in any of a variety of manners. For example, such sensors may be positioned around the television 501 generally in the same plane as the television screen 503. In such an exemplary scenario, on-screen pointing location may be determined in a manner similar to the interpolation and/or gain pattern intersection discussed above with regard to off-screen and/or on-screen sensors. Note that since the locations of the sensors are likely to be inconsistent between various television system configurations, a calibration procedure may be implemented (e.g., by the calibration module 251). Such calibration will be discussed in more detail below.

In an exemplary configuration, one or more photo detectors (e.g., photo diodes) and/or antenna elements (e.g., individual antennas or elements of an antenna array) may be incorporated into a plurality of respective surround sound speakers positioned around the television 501.

For example, in a photo detector implementation, passive photo detectors may receive varying amounts of respective light energy depending on the pointing direction of a light source aimed at the screen. As discussed previously, directed energy (e.g., light, RF, acoustic, etc.) may be transmitted in a pattern (or envelope), so even if a pointing device is pointed to a location on the television screen 530 along pointing line 525, sensors off-screen (or even off-television) may still receive energy from the transmission (albeit likely not with the same intensity at which energy is delivered along the pointing line 525). Also for example, received signals (e.g., pulsed signals) may arrive at different sensors at different respective times/phases (e.g., being indicative of relative position and/or pointing direction, which may also be utilized in a pointing determination).

In a photo detector implementation (e.g., utilizing photo diodes), photo diodes may, for example, be tuned to react to particular light frequencies to reduce interference from output pixel light and/or associated reflections, ambient light, room lighting, etc. As a non-limiting example, photo diodes may be tuned to detect light that is not visible to the human eye, visible light frequencies that are relatively rare, light patterns that are unlikely to occur in a television program (e.g., particular pulse codes), etc. In one example, the photo detectors integrated with off-television components may comprise photo diodes that operate to detect energy from a laser pointer or directed infrared energy from a controller (or other pointing device).

In an antenna element implementation, an array of antenna elements may be positioned around off-television components (e.g., in surround sound components). In an RF antenna implementation, passive antennas (or elements of an overall antenna matrix) may receive varying amounts of respective RF energy depending on the pointing direction of a directional RF source pointed at a location on the screen. Also for example, received signals (e.g., pulsed signals) may arrive at different antennas at different respective times/phases (e.g., being indicative of relative position and/or pointing direction, which may also be utilized in a pointing determination).

In an exemplary scenario, a user may point a pointing device (e.g., a remote controller, a laser pointer, directional RF transmitter, specifically designed eyewear, a mobile computing device, a mobile communication device, a gesture tracking device or glove, etc.) at the television screen 503, where the pointing device directs transmitted energy (e.g., light and/or RF energy and/or acoustic energy) at a particular location on the television screen 503 to which the user is pointing with the pointing device. Note that such transmitted energy will likely be transmitted directionally and be associated with an intensity or gain pattern with the highest intensity at the center of the pattern (i.e., along the pointing line 525) and decreasing as a function of angle from the center of the pattern. Such a gain pattern was discussed previously in the discussion of FIG. 4.

In such an exemplary scenario, each sensor of the sensors integrated into the television system 500 off-television will likely receive some amount of energy. For example, along a particular axis, the sensor nearest to the screen pointing location 530 (i.e., along the pointing line 525) will likely receive the highest amount of energy, a sensor next nearest to the screen pointing location 530 will likely receive a next highest range of energy, and sensors away from the pointing location 530 will likely receive progressively less amounts of energy from the pointing device 520, as a function of distance from the pointing location 530 and/or angle off the pointing line 525 (e.g., until such energy is lost in the noise floor). For example, sensor 553 is nearest to the pointing location 530 and will likely receive the highest energy, sensor 552 is next nearest to the pointing location 530, etc., and so on.

Note that in the implementation illustrated in FIG. 5, in particular since there are a relatively low number of sensors, signals from a same sensor may be utilized in determining multiple axes of pointing location. As mentioned previously, a calibration procedure may be performed when the system 500 is configured to assist in such pointing determination.

In an exemplary scenario, the user interface module 240 may receive signals indicative of the energy received by the sensors of the television system 500. The user interface module 240 may then, for example, provide information of such received sensor signals to the sensor processing module 253 for processing. The sensor processing module 253 may then, for example, operate to process such information to determine the screen pointing location. The sensor processing module 253 may perform such processing in any of a variety of manners, non-limiting examples of which will be provided below.

In an exemplary scenario, the sensor processing module 253 may operate to estimate a position between sensor positions based on relative sensor energy. For example, in the horizontal dimension, sensor 552 may correspond to a relatively high amount of energy, and sensor 556 may correspond to a relatively low amount of received energy. The sensor processing module 253 may, for example, estimate a horizontal position relatively closer to sensor 552 by an amount proportional to the relative difference between respective amounts of energy. The sensor processing module 253 may perform a similar estimation utilizing sensors 551 and 555. Various horizontal position estimations may then be averaged. Alternatively for example, respective energies for the left speaker 531 sensors may be averaged, respective energies for the right speaker 533 sensors may be averaged, and such left and right speaker average energies may then be utilized to determine a horizontal pointing location. The sensor processing module 253 may then, for example, perform a similar pointing direction estimate in the vertical direction.

In another exemplary scenario, a calibration procedure may be performed to determine an expected sensor energy level when the user is pointing at the sensor. In such a scenario, combined with a gain pattern and user (or pointing device) location relative to the television 501, a first line (e.g., a circle or arc) may be drawn around a first sensor 552. Similarly, a second line (e.g., a circle or arc) may be drawn around a second sensor 553, and the intersection of the first and second lines utilized as an estimate of pointing location. Additional lines associated with other sensors may also be utilized. Such additional lines may, for example, be utilized when selecting between multiple line intersections. Note that such line intersection solution may be applied to any of the previously discussed scenarios (e.g., as illustrated in FIGS. 3-4). A non-limiting example of this was presented in the discussion of FIG. 3, and another example will be provided in the following discussion of FIG. 6.

Figure 6:
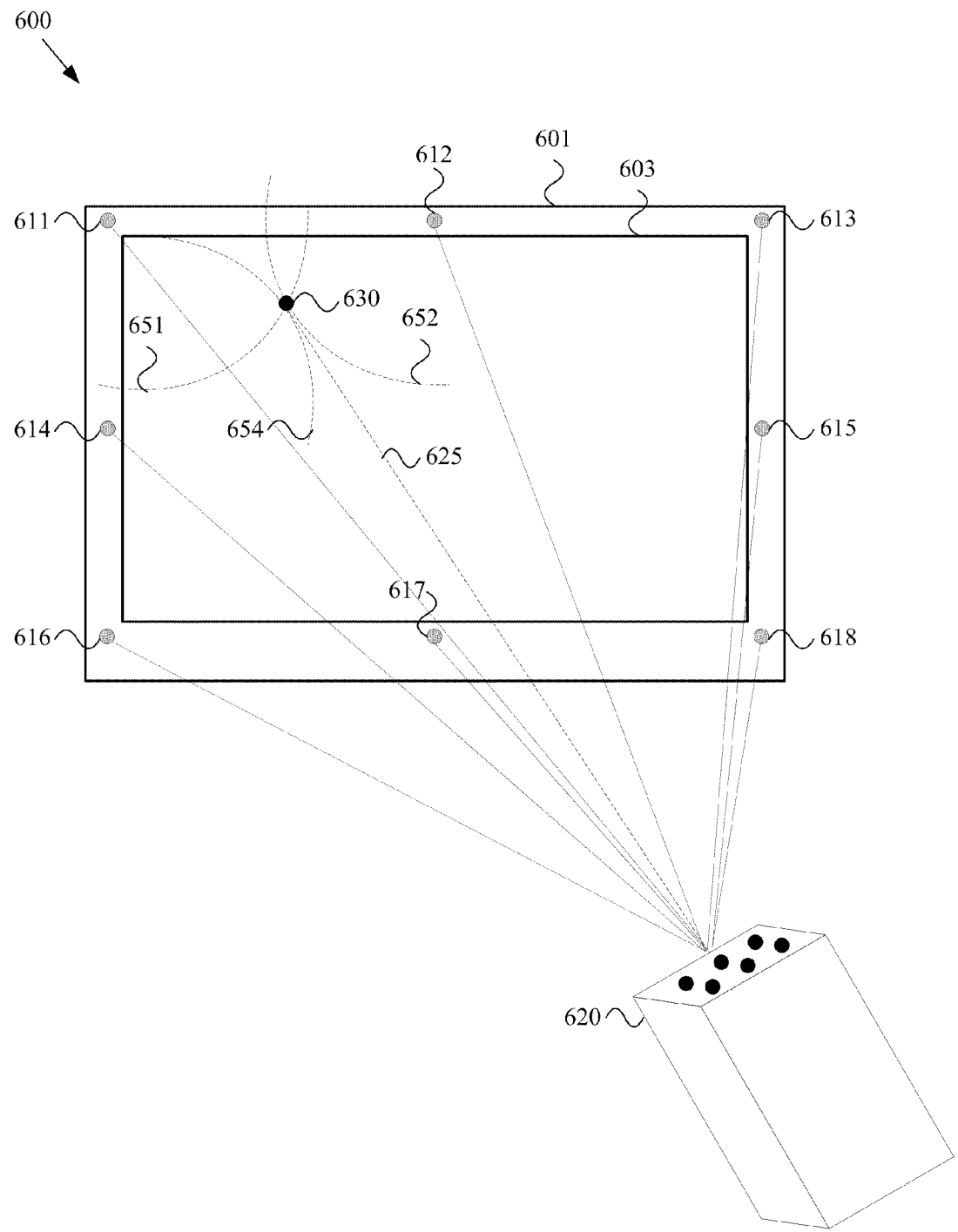
FIG. 6 is a diagram illustrating an exemplary television system with television controller sensors in accordance with various aspects of the present invention.

Various aspects of the present invention may also, for example, include one or more sensors incorporated into the pointing device. FIG. 6 is a diagram illustrating an exemplary television system 600 utilizing pointing device sensors in accordance with various aspects of the present invention.

The exemplary television system 600 includes a television 601 having a television screen 603. The television system 600 also includes a television controller 620 (e.g., a pointing device) that comprises one or more sensors (e.g., a plurality of antenna array elements, a plurality of photo detectors, etc.). In such a configuration, sensor information may be communicated to the user interface module 240 (e.g., via the first 210 or second 220 communication interface modules). Such information may then be communicated to the sensor processing module 253 for the determination of an on-screen pointing location.

In the exemplary configuration, the television 601 includes eight emitters (e.g., light emitters, RF transmitters, etc.) located around the border of the screen 603. For example, the television 601 includes a first emitter 611, second emitter 612, third emitter 613, fourth emitter 614, fifth emitter 615, sixth emitter 616, seventh emitter 617 and eighth emitter 618. Such emitters may each emit a signal that may be received at sensors on-board the controller 620. Such sensors may, for example, make up a directional receiver. In such a configuration, the controller 620 (or other pointing device) may be pointed to a location 630 on the screen 603 along a pointing line 625. With such an orientation and a directional signal reception pattern, the sensors on-board the controller 620 will receive the emitted signals at respective signal levels. Such sensor signals may then be processed in a manner similar to the manners discussed above to determine the on-screen pointing direction for the pointing device 620.

For example, through a calibration procedure, it may be known that the pointing device at a particular location should receive a particular amount of energy from each of the emitters 611-618 when pointed directly at such emitters. In such a scenario, the pointing device may measure respective signal energies received from each of the emitters (e.g., each distinguishable by frequency, coding, etc.) and communicate such information to the television 601. The pointing device may also, for example, communicate pointing device position (and/or orientation) information to the television. The television 601 may receive such sensor and/or position information via at least one of the communication interface modules 210, 220 and/or the user interface module 240 and process such sensor information with the sensor processing module 253.

The sensor processing module 253 may, for example, select a first emitter 612 (e.g., the emitter corresponding to the highest energy received at the pointing device). The sensor processing module 253 may then process the location of the pointing device, the receive gain pattern for the pointing device, and the energy received from the first emitter to determine a first figure (e.g., an arc 652) along which the pointing device, if pointed, would be expected to receive the measured energy. Similarly, the sensor processing module 253 may perform such a procedure for a second emitter 611 resulting in a second figure (e.g., an arc 651). The intersection of such arcs may be utilized as an estimate of on-screen pointing location. Additionally, for accuracy or for selecting between multiple intersection points, should they occur, the sensor processing module 253 may perform such a procedure for a third emitter 614 resulting in a third figure (e.g., an arc 654), and so on. The intersection of the three arcs 652, 651, 654 may then be utilized as an estimate of on-screen pointing location.

Alternatively, the solution need not be based on a known position (location) of the pointing device, nor on absolute received energy levels. In such a scenario, differences in received energy from the various emitters may be processed with or without position information of the on-screen pointing device. For example, the pointing device 620 may have six degrees of freedom (e.g., three positional degrees of freedom and three orientational degrees of freedom). In such a scenario, if the position and orientation of the television 601 are known, the unknown six degrees of freedom for the pointing device 620 may be ascertained by processing six known values related to such six degrees of freedom (e.g., related by a known signal energy pattern). In such a scenario, measurements associated with six emitters on the television (and potentially more) may be utilized to solve for the six degrees of freedom of the pointing device 620.

The above-mentioned exemplary scenarios were presented to illustrate numerous manners in which the television (e.g., sensor processing module 253) may operate to determine on-screen pointing location. Such examples are merely exemplary and thus the scope of various aspects of the present invention should not be limited by any particular characteristics of such examples unless explicitly claimed.

As discussed above, the calibration module 251 of the television 200 may operate to perform calibration operations. Such calibrating may be performed in any of a variety of manners. For example and without limitation, calibration may be utilized to determine expected received energy when transmitters and receivers are located and oriented in a particular manner. For example, a non-limiting example of a calibration procedure may comprise presenting an on-screen target at various locations and measuring respective sensor signals received when the pointing device is being pointed at such targets. Also for example, a calibration procedure may comprise directing a user (e.g., using the user interface module 240) to point to each of a plurality of sensors to determine an expected amount of received energy when the user is pointing directly at such sensors.

As mentioned previously, signal energy (or gain) pattern may be utilized in various on-screen pointing determinations. Such an energy (or gain) pattern may be predefined for a particular pointing device (e.g., at the factory), but may also be measured by the television 200. In a non-limiting example, the calibration module 251 may direct the user to utilize a pointing device to point to a location on the screen and process information received from multiple sensors (e.g., embedded in the screen, embedded in the television around the border of the screen, located in off-television devices, located in the pointing device, etc.) to develop a custom gain pattern for the particular pointing device. For example, such calibration may determine the shape of the gain pattern, the db falloff characteristics, etc.

Various aspects discussed above included the processing of position information. In such exemplary cases, the television 200 may comprise one or more location modules 232 that operate to determine relevant position information. The location module 232 may operate to perform such location determining (e.g., of the user or pointing device and/or the television) in any of a variety of manners. For example, the location module 232 may utilize a communication interface module 210, 220 to receive position information (e.g., of the television 200 or of the pointing device) from an external source of such information (e.g., global positioning system, cellular triangulation system, home triangulation system, etc.).

Also for example, the location module 232 may receive position information directly from the pointing device (e.g., where such pointing device has position-determining capability). For example, in a non-limiting exemplary scenario, where the pointing device is handheld computer, such computer may comprise GPS (or A-GPS) capability to determine its position. In such a scenario, the pointing device may wirelessly communicate information of its position to the television 200, and ultimately to the location module 252 via a communication interface module 210, 220.

Additionally for example, the location module 232 may operate to process sensor information to determine location of the pointing device (e.g., location in relation to the television screen). For example, as mentioned previously, a signal (e.g., a pulse) transmitted from a pointing device to the television will arrive at different sensors at different points in time depending on the respective distance from the pointing device to each sensor. The location module 232 may process such time-of-arrival information at various sensors to determine the position of the pointing device relative to the television. Similarly, in a scenario including signal emitters associated with the television and sensors on the pointing device, simultaneously transmitted signals from different emitters will arrive at the pointing device at different respective times depending on the position of the pointing device relative to such emitters. Alternatively, the location module 232 may also operate to process phase difference information (in addition to timing information or instead of such information) to determine pointing device location.

Once the television 200 (e.g., the sensor processing module 253) determines an on-screen pointing location, the television 200 may utilize such information in any of a variety of manners. For example and without limitation, the sensor processing module 253 may operate to generate information of the determined on-screen pointing location, and one or more modules of the television 200 may operate to present a visual indication on-screen to indicate to the user the on-screen location to which the television 200 has determined the user is pointing. Such a visual indication may, for example, comprise characteristics of a cursor or other graphical construct, bright spot, highlighting, color variation, brightness variation, etc. For example, the television 200 may operate to overlay such indication on video content (e.g., television programming) being presented to the user.

Additionally for example, the sensor processing module 253 may provide information of the determined on-screen pointing location to one or more other modules of the television 200 (e.g., the processing module 250 and/or other modules thereof) to identify an object in video content (e.g., television programming) to which a user is pointing. In such an exemplary scenario, one or more modules of the television 200 may operate to highlight an object to which the user is pointing and/or provide information regarding such object.

Further for example, various modules of the television 200 (e.g., the processor module 250) may operate to communicate on-screen pointing location information to television system components separate from the television (e.g., to a television receiver, video recorder, remote programming source, communication network infrastructure, advertising company, provider of goods and/or services, etc.). Also for example, various modules of the television 200 may operate to communicate information of the determined on-screen pointing location to the pointing device of the user (e.g., for providing pointing feedback to the user at a remote controller, etc.).

Figure 7:
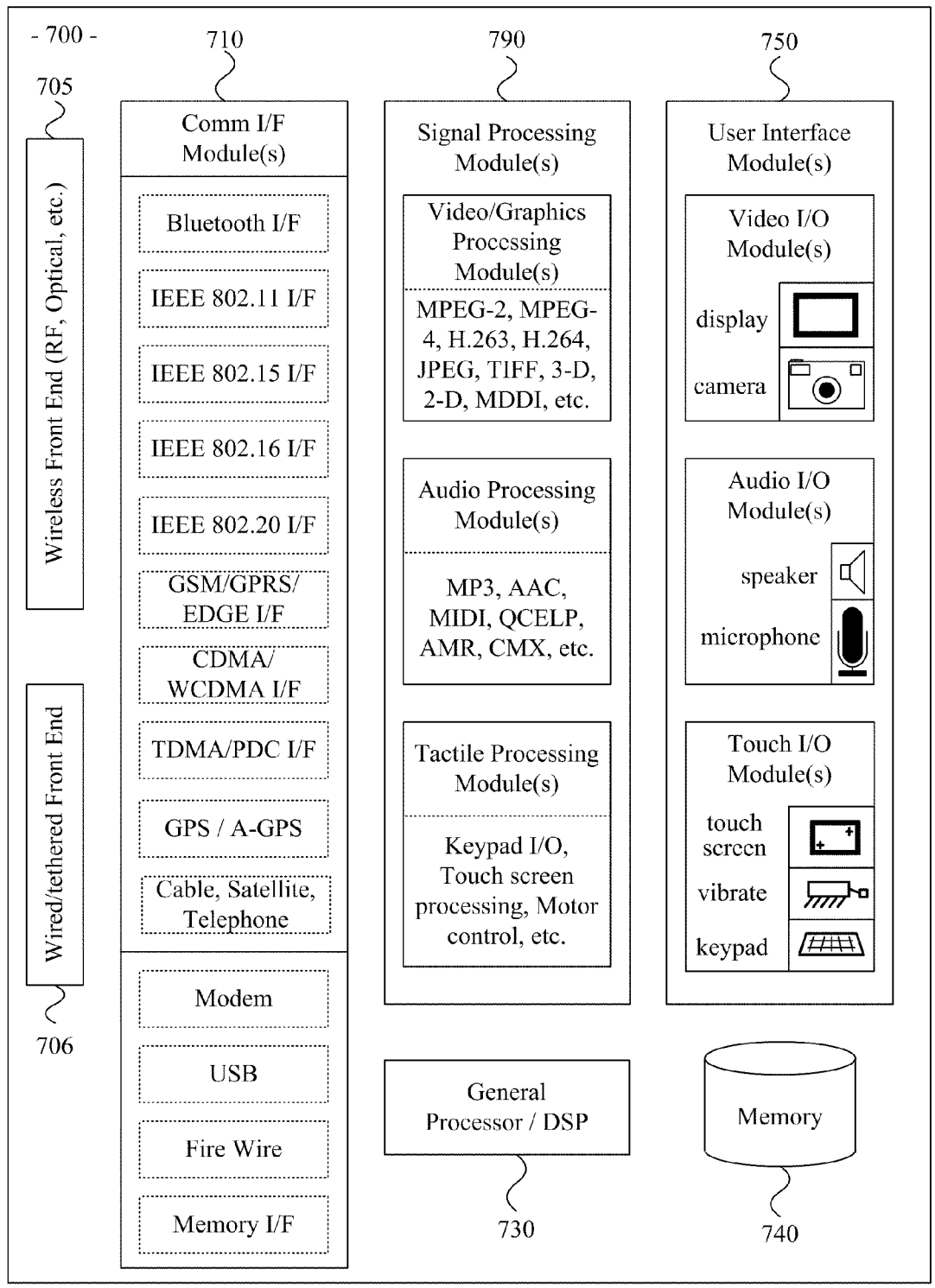
FIG. 7 is a diagram illustrating an exemplary television in accordance with various aspects of the present invention.

FIG. 2 provided a diagram illustrating an exemplary television in accordance with various aspects of the present invention. FIG. 7 provides another diagram illustrating an exemplary television 700 in accordance with various aspects of the present invention. The exemplary television 700 may share any or all aspects with any of the televisions discussed herein and illustrated in FIGS. 1-6. For example, the exemplary television 700 (or various modules thereof) may operate to perform any or all functionality discussed herein. As with the exemplary system 200, the components of the exemplary system 700 may be in a single television device (e.g., a console television, flat panel television, portable/mobile television device, mobile television device, etc.).

For example, the television 700 comprises a processor 730. Such a processor 730 may, for example, share any or all characteristics with the processor 250 discussed with regard to FIG. 2. Also for example, the television 700 comprises a memory 740. Such memory 740 may, for example, share any or all characteristics with the memory 260 discussed with regard to FIG. 2.

Also for example, the television 700 may comprise any of a variety of user interface module(s) 750. Such user interface module(s) 750 may, for example, share any or all characteristics with the user interface module(s) 240 discussed previously with regard to FIG. 2. For example and without limitation, the user interface module(s) 750 may comprise: a display device, a camera (for still or moving picture acquisition), a speaker, an earphone (e.g., wired or wireless), a microphone, a video screen (e.g., a touch screen), a vibrating mechanism, a keypad, and/or any of a variety of other user interface devices (e.g., a mouse, a trackball, a touch pad, touch screen, light pen, game controlling device, etc.).

The exemplary television 700 may also, for example, comprise any of a variety of communication modules (705, 706, and 710). Such communication module(s) may, for example, share any or all characteristics with the communication interface module(s) 210, 220 discussed previously with regard to FIG. 2. For example and without limitation, the communication interface module(s) 710 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1x-EV-DO, WCDMA/HSDPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, Ethernet, wireline and/or cable modem, etc.); any of a variety of communication interface modules related to communicating with external memory devices; etc. The exemplary television 700 is also illustrated as comprising various wired 706 and/or wireless 705 front-end modules that may, for example, be included in the communication interface modules and/or utilized thereby.

The exemplary television 700 may also comprise any of a variety of signal processing module(s) 790. Such signal processing module(s) 790 may, for example, be utilized to assist in processing various types of information discussed previously (e.g., with regard to sensor processing, position determination, video processing, image processing, audio processing, general user interface information data processing, etc.). For example and without limitation, the signal processing module(s) 790 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., Keypad I/O, touch screen processing, motor control, etc.).

Various aspects of the present invention were previously exemplified by non-limiting illustrations and described in terms of operations performed by various modules of the television. Various aspects of the present invention will now be illustrated in the form of method flow diagrams.

Figure 8:
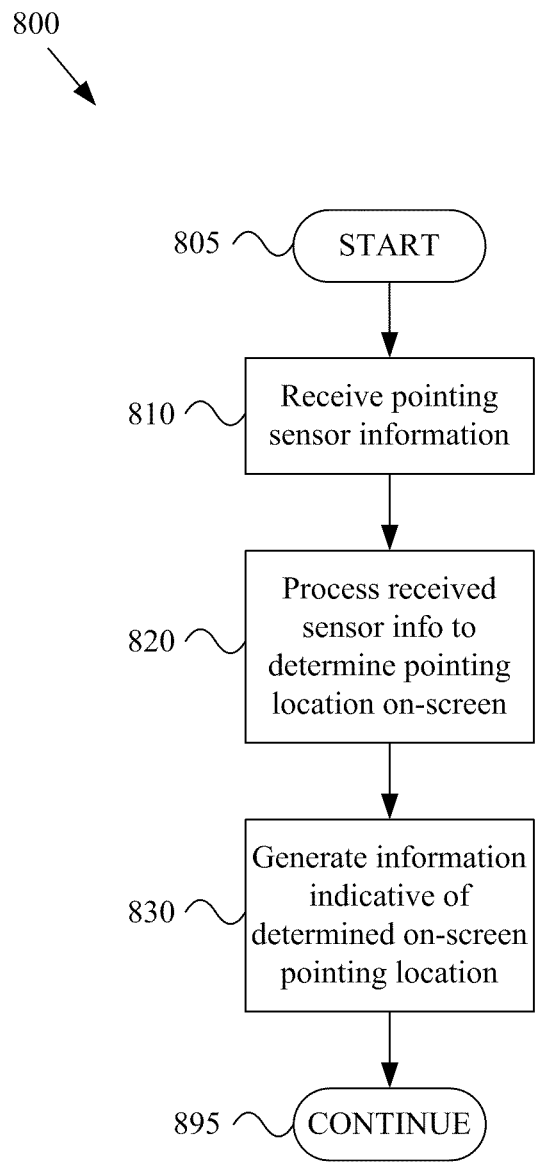
FIG. 8 is a flow diagram illustrating the generation of on-screen pointing information in accordance with various aspects of the present invention.

FIG. 8 is a flow diagram 800 illustrating the generation of on-screen pointing information in accordance with various aspects of the present invention. The exemplary method 800 may, for example, share any or all characteristics with the television operation discussed previously.

The exemplary method 800 may begin executing at step 805. The exemplary method 800 may begin executing in response to any of a variety of causes and/or conditions. For example and without limitation, the method 800 may begin executing in response to a user command to begin, detected user interaction with a pointing device (e.g., a television controller), detected user presence in the vicinity, detected user interaction with a television implementing the method 800, etc. Also for example, the method 800 may begin executing in response to a television presenting programming or other video content for which on-screen pointing is enabled and/or relevant.

The exemplary method 800 may, for example at step 810, comprise receiving pointing sensor information. For example and without limitation, step 810 may comprise any or all sensor information receiving characteristics described previously with regard the various modules of the exemplary televisions illustrated in FIGS. 1-7 and discussed previously. For example, step 810 may share any or all sensor information receiving characteristics discussed previously with regard to at least the user interface module 240, processor module 250, communication interface modules 210, 220, sensor processing module 253, location module 252 and calibration module 251.

Step 810 may, for example, comprise receiving sensor information from (or associated with) sensors integrated in the television screen. Also for example, step 810 may comprise receiving sensor information from (or associated with) off-screen sensors integrated with the television body, off-television sensors, sensors integrated with a pointing device (e.g., a television controller), etc. As discussed previously, such sensors may comprise any of a variety of characteristics, including without limitation, characteristics of light sensors, RF sensors, acoustic sensors, active and/or passive sensors, etc.

In general, step 810 may comprise receiving pointing sensor information. Accordingly, the scope of various aspects of the present invention should not be limited by characteristics of any particular manner of receiving pointing sensor information unless explicitly claimed.

The exemplary method 800 may, at step 820, comprise processing received sensor information (e.g., as received at step 810) to determine a location on a screen of the television to which a user is pointing (e.g., pointing with a pointing device). For example and without limitation, step 820 may comprise any or all pointing location processing characteristics described previously with regard the various modules of the exemplary televisions illustrated in FIGS. 1-7 and discussed previously. For example, step 820 may share any or all pointing location determining characteristics discussed previously with regard to at least the processor module 250, sensor processing module 253, location module 252 and calibration module 251.

Step 820 may, for example, comprise determining on-screen pointing location in any of a variety of manners. For example, step 820 may comprise determining on-screen pointing location based on a location of a selected sensor, based on interpolation between sensor locations (e.g., linear and/or non-linear interpolation), based on determining energy pattern intersection(s), etc. Many examples of such determining were provided previously.

In general, step 820 may comprise processing received sensor information (e.g., independently and/or in conjunction with other information) to determine a location on a screen of the television to which a user is pointing. Accordingly, the scope of various aspects of the present invention should not be limited by characteristics of any particular manner of performing such processing unless explicitly claimed.

The exemplary method 800 may, at step 830, comprise generating information indicative of a determined on-screen pointing location (e.g., as determined at step 820). For example and without limitation, step 830 may comprise any or all pointing location information generation characteristics described previously with regard the various modules of the exemplary televisions illustrated in FIGS. 1-7 and discussed previously. For example, step 830 may share any or all information generation characteristics discussed previously with regard to at least the processor module 250, sensor processing module 253, location module 252, calibration module 251, user interface module 240 and/or communication interface modules 210, 220.

Step 830 may, for example, comprise generating such information in any of a variety of manners. For example, step 830 may comprise generating on-screen pointing location data to communicate to internal modules of the television, to equipment external to the television, to television network components, to a television programming source, etc. Such information may, for example, be communicated to various system components and may also be presented to the user (e.g., utilizing visual feedback displayed on a screen of the television). Such information may, for example, be generated in the form of screen coordinates, identification of a video content object (e.g., a programming object or person) to which an on-screen pointing location corresponds, generation of an on-screen cursor or highlight or other graphical feature, etc.

In general, step 830 may comprise processing generating information indicative of a determined on-screen pointing location. Accordingly, the scope of various aspects of the present invention should not be limited by characteristics of any particular manner of generating such information unless explicitly claimed.

The exemplary method 800 may, at step 895, comprise performing continued processing. Such continued processing may comprise characteristics of any of a variety of types of continued processing, various examples of which were presented previously. For example and without limitation, step 895 may comprise looping execution flow back up to an earlier step (e.g., step 810). Also for example, step 895 may comprise presenting visual feedback indicia of the on-screen pointing location for a user. Additionally for example, step 895 may comprise communicating information of the on-screen pointing location to system components external to the television implementing the method 800. Further for example, step 895 may comprise utilizing the on-screen pointing information to identify a video content object (e.g., an object presented in television programming) to which a user is pointing, etc.

In general, step 895 may comprise performing continued processing. Accordingly, the scope of various aspects of the present invention should not be limited by characteristics of any particular manner of performing continued processing unless explicitly claimed.

Figure 9:
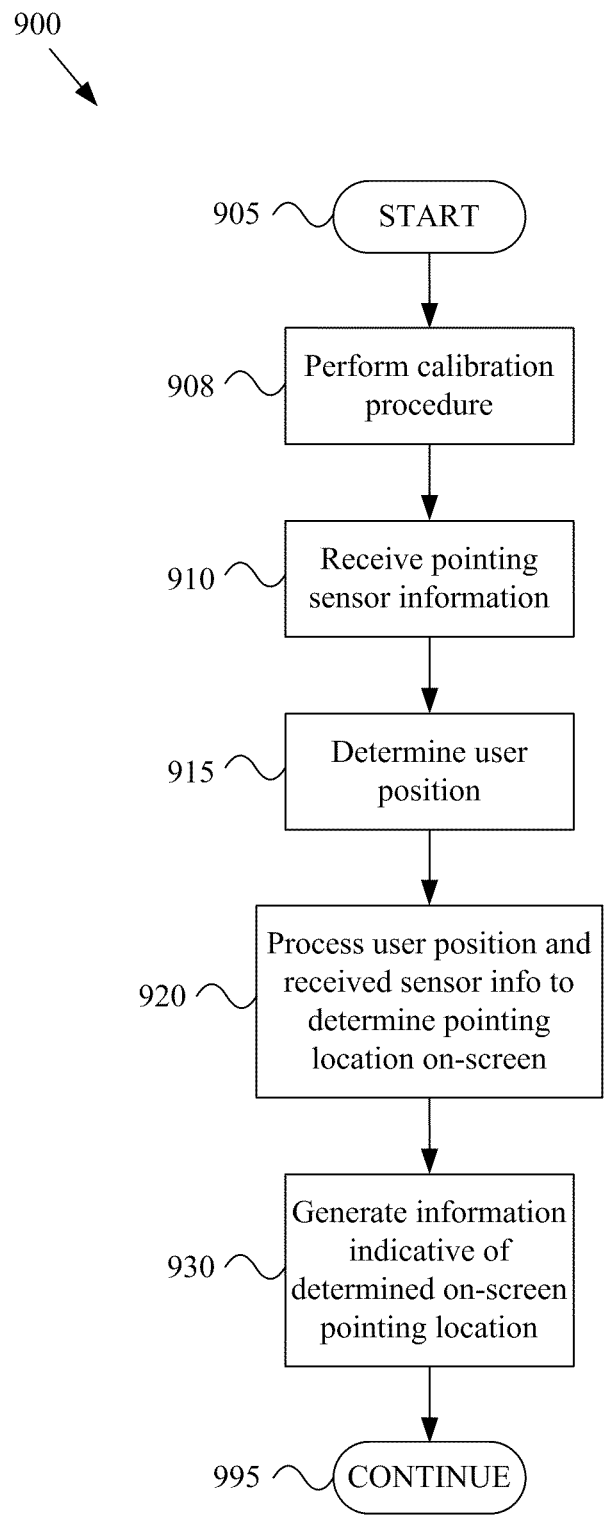
FIG. 9 is a flow diagram illustrating the generation of on-screen pointing information in accordance with various aspects of the present invention.

Turning next to FIG. 9, such figure is a flow diagram 900 illustrating the generation of on-screen pointing information in accordance with various aspects of the present invention. The exemplary method 900 may, for example, share any or all characteristics with the television operation discussed previously (e.g., in reference to FIGS. 1-8).

The exemplary method 900 may begin executing at step 905. Step 905 may, for example, share any or all characteristics with step 805 of the exemplary method 800 illustrated in FIG. 8 and discussed previously.

The exemplary method 900 may, for example at step 908, comprise performing a calibration procedure with the user. Such a calibration procedure may, for example, be performed to develop a manner of processing received sensor information to determine on-screen pointing location. Step 908 may, for example, comprise any or all calibration aspects discussed previously (e.g., with reference to the calibration module 251).

The exemplary method 900 may, for example at step 910, comprise receiving pointing sensor information. For example and without limitation, step 910 may comprise any or all sensor information receiving characteristics described previously with regard the various modules of the exemplary televisions illustrated in FIGS. 1-7 and FIG. 8 (e.g., step 810) and discussed previously.

The exemplary method 900 may, for example at step 915, comprise determining user position (e.g., determining position of a user pointing device). For example and without limitation, step 915 may comprise any or all position determining characteristics discussed previously with regard to FIGS. 1-7. Note that position may also, for example, include orientation.

For example, step 915 may share any or all position determining characteristics discussed previously with regard to at least the processor module 250, sensor processing module 253, location module 252 and calibration module 251. For example, step 915 may comprise determining user position based, at least in part, on received sensor signals. Also for example, step 915 may comprise determining user position based, at least in part, on position information received from one or more systems external to the television implementing the method 900.

In general, step 915 may comprise determining user position (e.g., pointing device position). Accordingly, the scope of various aspects of the present invention should not be limited by characteristics of any particular manner of determining user position unless explicitly claimed.

The exemplary method 900 may, for example, at step 920, comprise processing received sensor information (e.g., as received at step 910) and user position information (e.g., as determined at step 915) to determine a location on a screen of the television to which a user is pointing (e.g., pointing with a pointing device). For example and without limitation, step 920 may comprise any or all pointing location characteristics described previously with regard the various modules of the exemplary televisions illustrated in FIGS. 1-7 and FIG. 8 (e.g., step 820) and discussed previously. For example, step 920 may share any or all pointing location determining characteristics discussed previously with regard to at least the processor module 250, sensor processing module 253, location module 252 and calibration module 251.

Step 920 may, for example, comprise determining on-screen pointing location in any of a variety of manners. For example, step 920 may comprise determining on-screen pointing location based on a location of a selected sensor, based on location of the pointing device, based on interpolation between sensor locations (e.g., linear and/or non-linear interpolation), based on energy pattern intersection points, etc. Many examples of such determining were provided previously.

In general, step 920 may comprise processing received sensor information and user position information to determine a location on a screen of the television to which a user is pointing (e.g., pointing with a pointing device). Accordingly, the scope of various aspects of the present invention should not be limited by characteristics of any particular manner of performing such processing unless explicitly claimed.

The exemplary method 900 may, at step 930, comprise generating information indicative of a determined on-screen pointing location (e.g., as determined at step 920). For example and without limitation, step 930 may comprise any or all information generation characteristics described previously with regard the various modules of the exemplary televisions illustrated in FIGS. 1-7 and FIG. 8 (e.g., step 830) and discussed previously. For example, step 930 may share any or all information generation characteristics discussed previously with regard to at least the processor module 250, sensor processing module 253, location module 252, calibration module 251, user interface module 240 and/or communication interface modules 210, 220.

The exemplary method 900 may, at step 995, comprise performing continued processing. Such continued processing may comprise characteristics of any of a variety of types of continued processing, various examples of which were presented previously. For example and without limitation, step 995 may comprise looping execution flow back up to an earlier step (e.g., step 908). Also for example, step 995 may comprise presenting visual feedback indicia of the on-screen pointing location for a user. Additionally for example, step 995 may comprise communicating information of the on-screen pointing location to system components external to the television implementing the method 900. Further for example, step 995 may comprise utilizing the on-screen pointing information to identify a video content object (e.g., an object presented in television programming) to which a user is pointing, etc.

In general, step 995 may comprise performing continued processing. Accordingly, the scope of various aspects of the present invention should not be limited by characteristics of any particular manner of performing continued processing unless explicitly claimed.

In summary, various aspects of the present invention provide a system and method for generating screen pointing information. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method, in a television having a screen, for generating screen pointing information, the method comprising:
   receiving, by a first sensor, a first energy signal generated by a device external to the television pointing to a location on the screen;
   receiving, from the first sensor, a first sensor information, the sensor information comprises a first pattern corresponding to an intensity of the first energy signal received at the first sensor;
   receiving, by a second sensor, a second energy signal generated by the device;
   receiving, from the second sensor, a second sensor information, the second sensor information comprises a second pattern corresponding to an intensity of the second energy signal received at the second sensor;
   processing, by a processor, the first sensor information and the second sensor information to determine said location on the screen to which the device is pointing, based on an intersection of the first pattern and the second pattern; and
   generating information indicative of said determined location on the screen.

2. The method of claim 1, comprising, in the television, outputting on the screen a visual indication of said determined location on the screen.

3. The method of claim 2, comprising, in the television, overlaying the visual indication on a television program being presented on the screen.

4. The method of claim 1, wherein the first sensor and the second sensor are passive sensors.

5. The method of claim 1, wherein the first sensor and the second sensor are active sensors.

6. The method of claim 1, comprising, in the television, performing a calibration procedure with the first and second energy signals to determine a location of the device.

7. The method of claim 1, wherein processing the first sensor information and the second sensor information to determine said location on the screen to which the device is pointing comprises interpolating between the respective intensities of the first and second signals.

8. A television that generates screen pointing information, the television having a screen, the television comprising:
   at least one processor operable to, at least:
      receive sensor information from a plurality of sensors, the sensor information being output by the sensors in response to receipt of an energy signal from a device, the sensor information being related to a location on the screen to which the device is pointing based on a phase difference in the energy signal detected by the sensors;
      process said received sensor information to determine said location on the screen to which the device is pointing based on identification of a sensor from the plurality of sensors that receives highest intensity of the energy signal; and
      generate information indicative of said determined location on the screen.

9. The television of claim 8, wherein the at least one processor is operable to output on the screen a visual indication of said determined location on the screen.

10. The television of claim 9, wherein the at least one processor is operable to overlay the visual indication on a television program being presented on the screen.

11. The television of claim 8, wherein the plurality of sensors is a plurality of passive sensors.

12. The television of claim 8, wherein the plurality of sensors is a plurality of active sensors.

13. The television of claim 8, wherein the at least one processor is operable to process said received sensor information to determine said location on the screen to which the device is pointing by, at least in part, operating to interpolate between intensities of the signal received by each respective sensor from the plurality of sensors.

14. A method, in a television having a screen, for generating screen pointing information, the method comprising:
   in the television:
      receiving a plurality of energy signals in a plurality of sensors;
      receiving sensor information from the plurality of sensors, the plurality of sensors being integrated into a transparent screen overlay, the sensor information being related to a location on the screen to which a device is pointing;
      processing said received sensor information to determine said location on the screen to which the device is pointing wherein the location is determined based on sensor information from a sensor group that is identified from among the plurality of sensors, the sensor group being identified in response to each sensor in the identified group receiving at least a threshold amount of energy from the plurality of energy signals; and
      generating information indicative of said determined location on the screen.

15. The method of claim 14, wherein processing said received sensor information to determine said location on the screen to which the device is pointing comprises selecting a sensor from the identified group of sensors corresponding to a strongest energy signal from the received plurality of energy signals.

16. The method of claim 14, wherein processing said received sensor information to determine said location on the screen to which the device is pointing comprises interpolating among locations of the sensors in the identified group of sensors.

17. The television of claim 8, wherein the plurality of sensors comprises an array of antenna elements integrated between pixels of the screen.

18. The television of claim 8, wherein the plurality of sensors comprises an array of antenna elements integrated behind pixels of the screen.

19. The television of claim 8, wherein a block of pixels corresponds to an array of photo diodes integrated into the screen.

20. The method of claim 1, further comprising processing the first sensor information and the second sensor information to determine a location of the device based on a temporal difference in the first and second energy signals.

21. The method of claim 14, further comprising performing a non-linear splining among the sensor group to determine the location.

22. The method of claim 14, wherein the identified group of sensors comprises a first sensor and a second sensor, the first sensor receives a first intensity of energy and the second sensor receives a second intensity of energy, and said location on the screen is determined based on a ratio of the first intensity and the second intensity.

23. The television of claim 8, wherein the sensor that receives the highest intensity of the energy signal is a highest-intensity sensor, and the at least one processor is further operable to:
   process the sensor information to determine said location on the screen to which the device is pointing based on identification of a closed figure pattern of the energy signal received by the highest-intensity sensor, wherein the closed figure pattern surrounds said highest-intensity sensor.

24. The television of claim 23, wherein the closed figure pattern surrounding the highest-intensity sensor is a first closed figure, and the at least one processor is further operable to process the sensor information to determine said location on the screen to which the device is pointing based on:
   identification of another sensor from the plurality of sensors that receives second highest intensity of the energy signal, the another sensor being a second-highest-intensity sensor;
   identification of a second closed figure pattern of the energy signal received by the second-highest-intensity sensor, wherein the second closed figure pattern surrounds said second-highest-intensity sensor; and
   determination of an intersection of the first closed figure and the second closed figure.

25. The television of claim 8, wherein the plurality of sensors are integrated into audio speakers of the television.

26. The method of claim 1, wherein the first sensor and the second sensor are integrated into audio speakers of the television.

27. The method of claim 1, wherein the first sensor and the second sensor are integrated into the screen of the television.

* * * * *